US009977575B2

(12) United States Patent
Smuga et al.

(10) Patent No.: US 9,977,575 B2
(45) Date of Patent: May 22, 2018

(54) CHROMELESS USER INTERFACE

(71) Applicant: Microsoft Technology Licensing, LLC, Redmond, WA (US)

(72) Inventors: Michael A. Smuga, Seattle, WA (US); Darren A. Apfel, Redmond, WA (US); Jason S. Schneekloth, Redmond, WA (US); Ryan M. Haning, Issaquah, WA (US); Michael J. Kruzeniski, Sausalito, CA (US); Michael K. Henderlight, Sammamish, WA (US); Brian M. Wilson, Mercer Island, WA (US); Paula Guntaur, Seattle, WA (US); Chad A. Voss, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 14/517,457

(22) Filed: Oct. 17, 2014

(65) Prior Publication Data

US 2015/0040057 A1 Feb. 5, 2015

Related U.S. Application Data

(63) Continuation of application No. 13/418,884, filed on Mar. 13, 2012, now Pat. No. 8,914,072, which is a
(Continued)

(51) Int. Cl.

| | |
|---|---|
| ***G06F 3/0484*** | (2013.01) |
| ***G06F 3/0482*** | (2013.01) |
| ***H04M 1/725*** | (2006.01) |

(52) U.S. Cl.
CPC ........ *G06F 3/04842* (2013.01); *G06F 3/0482* (2013.01); *H04M 1/72519* (2013.01); *H04M 1/72544* (2013.01); *H04M 1/72583* (2013.01)

(58) Field of Classification Search
CPC ......... H04M 1/72519; H04M 1/72544; H04M 1/72583; G06F 3/0482
(Continued)

(56) References Cited

U.S. PATENT DOCUMENTS

| | | | |
|---|---|---|---|
| 4,823,283 | A | 4/1989 | Diehm et al. |
| 5,045,997 | A | 9/1991 | Watanabe |

(Continued)

FOREIGN PATENT DOCUMENTS

| | | |
|---|---|---|
| CA | 2363978 | 5/2003 |
| CN | 1749936 | 3/2006 |

(Continued)

OTHER PUBLICATIONS

Korea Office Action (w/English Translation), dated Jan. 15, 2016, from Korea Patent Application No. 10-2011-7022964 (corresponding to grandparent), 8 pages.

(Continued)

*Primary Examiner* — Cong Tran
(74) *Attorney, Agent, or Firm* — Klarquist Sparkman, LLP

(57) ABSTRACT

Techniques are described to implement a user interface for a display of a mobile device. In an implementation, the user interface may include a chromeless menu configured to be displayed when menu-based user input to the mobile device is available; a system tray configured to be displayed on the display when a notice containing status information affecting operability of the mobile device is available; and a task switcher module operable to cause a chromeless overlay be displayed over an active application being executed by the mobile device to allow selection of one or more applications of the mobile device.

20 Claims, 10 Drawing Sheets

Related U.S. Application Data continuation of application No. 12/414,455, filed on Mar. 30, 2009, now Pat. No. 8,175,653.

(58) Field of Classification Search
USPC .... 455/95, 154.2, 457, 550.1; 345/169, 173; 715/761, 828, 841
See application file for complete search history.

(56) References Cited

U.S. PATENT DOCUMENTS 5,046,001 A 9/1991 Barker et al.
5,189,732 A 2/1993 Kondo
5,258,748 A 11/1993 Jones
5,297,032 A 3/1994 Trojan et al.
5,321,750 A 6/1994 Nadan
5,339,392 A 8/1994 Risberg et al.
5,404,442 A 4/1995 Foster et al.
5,432,932 A 7/1995 Chen et al.
5,463,725 A 10/1995 Henckel et al.
5,485,197 A 1/1996 Hoarty
5,495,566 A 2/1996 Kwatinetz
5,515,495 A 5/1996 Ikemoto
5,574,836 A 11/1996 Broemmelsiek
5,598,523 A 1/1997 Fujita
5,611,060 A 3/1997 Belfiore et al.
5,623,613 A 4/1997 Rowe et al.
5,640,176 A 6/1997 Mundt et al.
5,650,827 A 7/1997 Tsumori et al.
5,657,049 A 8/1997 Ludolph et al.
5,675,329 A 10/1997 Barker
5,687,331 A 11/1997 Volk et al.
5,712,995 A 1/1998 Cohn
5,754,178 A 5/1998 Johnston, Jr. et al.
5,771,042 A 6/1998 Santos-Gomez
5,793,415 A 8/1998 Gregory et al.
5,819,284 A 10/1998 Farber et al.
5,860,073 A 1/1999 Ferrel et al.
5,905,492 A 5/1999 Straub et al.
5,914,720 A 6/1999 Maples et al.
5,940,076 A 8/1999 Sommers et al.
5,959,621 A 9/1999 Nawaz et al.
5,963,204 A 10/1999 Ikeda et al.
6,008,809 A 12/1999 Brooks
6,008,816 A 12/1999 Eisler
6,009,519 A 12/1999 Jones et al.
6,011,542 A 1/2000 Durrani et al.
6,028,600 A 2/2000 Rosin et al.
6,057,839 A 5/2000 Advani et al.
6,064,383 A 5/2000 Skelly
6,104,418 A 8/2000 Tanaka et al.
6,108,003 A 8/2000 Hall, Jr. et al.
6,111,585 A 8/2000 Choi
6,115,040 A 9/2000 Bladow et al.
6,166,736 A 12/2000 Hugh
6,184,879 B1 2/2001 Minemura et al.
6,188,405 B1 2/2001 Czerwinski et al.
6,211,921 B1 4/2001 Cherian et al.
6,212,564 B1 4/2001 Harter et al.
6,216,141 B1 4/2001 Straub et al.
6,266,098 B1 7/2001 Cove et al.
6,278,448 B1 8/2001 Brown et al.
6,281,940 B1 8/2001 Sciammarella
6,311,058 B1 10/2001 Wecker et al.
6,317,142 B1 11/2001 Decoste et al.
6,369,837 B1 4/2002 Schirmer
6,385,630 B1 5/2002 Ejerhed
6,396,963 B2 5/2002 Shaffer
6,411,307 B1 6/2002 Rosin et al.
6,424,338 B1 7/2002 Andersone
6,426,753 B1 7/2002 Migdal
6,433,789 B1 8/2002 Rosman
6,448,987 B1 9/2002 Easty et al.
6,449,638 B1 9/2002 Wecker et al.
6,456,334 B1 9/2002 Duhault
6,489,977 B2 12/2002 Sone
6,505,243 B1 1/2003 Lortz
6,507,643 B1 1/2003 Groner
6,510,144 B1 1/2003 Dommety et al.
6,510,466 B1 1/2003 Cox et al.
6,510,553 B1 1/2003 Hazra
6,538,635 B1 3/2003 Ringot
6,570,582 B1 5/2003 Sciammarella et al.
6,570,597 B1 5/2003 Seki et al.
6,577,323 B1 6/2003 Jamieson et al.
6,577,350 B1 6/2003 Proehl et al.
6,591,244 B2 7/2003 Jim et al.
6,597,374 B1 7/2003 Baker et al.
6,628,309 B1 9/2003 Dodson et al.
6,636,246 B1 10/2003 Gallo et al.
6,642,944 B2 11/2003 Conrad et al.
6,662,023 B1 12/2003 Helle
6,690,387 B2 2/2004 Zimmerman et al.
6,697,825 B1 2/2004 Underwood et al.
6,707,449 B2 3/2004 Hinckley et al.
6,710,771 B1 3/2004 Yamaguchi et al.
6,721,958 B1 4/2004 Dureau
6,724,403 B1 4/2004 Santoro et al.
6,784,925 B1 8/2004 Tomat et al.
6,798,421 B2 9/2004 Baldwin
6,801,203 B1 10/2004 Hussain
6,807,558 B1 10/2004 Hassett et al.
6,832,355 B1 12/2004 Duperrouzel et al.
6,857,104 B1 2/2005 Cahn
6,865,297 B2 3/2005 Loui
6,873,329 B2 3/2005 Cohen et al.
6,876,312 B2 4/2005 Yu
6,885,974 B2 4/2005 Holle
6,904,597 B2 6/2005 Jin
6,920,445 B2 7/2005 Bae
6,938,101 B2 8/2005 Hayes et al.
6,961,731 B2 11/2005 Holbrook
6,972,776 B2 12/2005 Davis et al.
6,975,306 B2 12/2005 Hinckley
6,976,210 B1 12/2005 Silva et al.
6,978,303 B1 12/2005 McCreesh et al.
6,983,310 B2 1/2006 Rouse
6,987,991 B2 1/2006 Nelson
7,007,238 B2 2/2006 Glaser
7,013,041 B2 3/2006 Miyamoto
7,017,119 B1 3/2006 Johnston et al.
7,019,757 B2 3/2006 Brown et al.
7,028,264 B2 4/2006 Santoro et al.
7,032,187 B2 4/2006 Keely, Jr. et al.
7,036,090 B1 4/2006 Nguyen
7,036,091 B1 4/2006 Nguyen
7,042,460 B2 5/2006 Hussain et al.
7,051,291 B2 5/2006 Sciammarella et al.
7,058,955 B2 6/2006 Porkka
7,065,385 B2 6/2006 Jarrad et al.
7,065,386 B1 6/2006 Smethers
7,075,535 B2 7/2006 Aguera y Arcas
7,089,507 B2 8/2006 Lection et al.
7,091,998 B2 8/2006 Miller-Smith
7,093,201 B2 8/2006 Duarte
7,106,349 B2 9/2006 Baar et al.
7,111,044 B2 9/2006 Lee
7,133,707 B1 11/2006 Rak
7,133,859 B1 11/2006 Wong
7,139,800 B2 11/2006 Bellotti et al.
7,146,573 B2 12/2006 Brown et al.
7,155,729 B1 12/2006 Andrew et al.
7,158,123 B2 1/2007 Myers et al.
7,158,135 B2 1/2007 Santodomingo et al.
7,178,111 B2 2/2007 Glein et al.
7,197,702 B2 3/2007 Niyogi et al.
7,210,099 B2 4/2007 Rohrabaugh et al.
7,213,079 B2 5/2007 Narin
7,216,588 B2 5/2007 Suess
7,249,326 B2 7/2007 Stoakley et al.
7,262,775 B2 8/2007 Calkins et al.
7,263,668 B1 8/2007 Lentz
7,280,097 B2 10/2007 Chen
7,283,620 B2 10/2007 Adamczyk
7,289,806 B2 10/2007 Morris et al.

(56) References Cited

U.S. PATENT DOCUMENTS 7,296,184 B2 11/2007 Derks et al.
7,296,242 B2 11/2007 Agata et al.
7,310,100 B2 12/2007 Hussain
7,333,092 B2 2/2008 Zadesky et al.
7,333,120 B2 2/2008 Venolia
7,336,263 B2 2/2008 Valikangas
7,369,647 B2 5/2008 Gao et al.
7,376,907 B2 5/2008 Santoro et al.
7,386,807 B2 6/2008 Cummins et al.
7,388,578 B2 6/2008 Tao
7,403,191 B2 7/2008 Sinclair
7,408,538 B2 8/2008 Hinckley et al.
7,433,920 B2 10/2008 Blagsvedt et al.
7,447,520 B2 11/2008 Scott
7,461,151 B2 12/2008 Colson et al.
7,469,380 B2 12/2008 Wessling et al.
7,469,381 B2 12/2008 Ording
7,478,326 B2 1/2009 Holecek et al.
7,479,949 B2 1/2009 Jobs
7,480,870 B2 1/2009 Anzures
7,483,418 B2 1/2009 Maurer
7,487,467 B1 2/2009 Kawahara et al.
7,496,830 B2 2/2009 Rubin
7,512,966 B2 3/2009 Lyons, Jr. et al.
7,577,918 B2 8/2009 Lindsay
7,581,034 B2 8/2009 Polivy et al.
7,593,995 B1 9/2009 He et al.
7,599,790 B2 10/2009 Rasmussen et al.
7,600,189 B2 10/2009 Fujisawa
7,600,234 B2 10/2009 Dobrowski et al.
7,606,714 B2 10/2009 Williams et al.
7,607,106 B2 10/2009 Ernst et al.
7,610,563 B2 10/2009 Nelson et al.
7,614,018 B1 11/2009 Ohazama et al.
7,619,615 B1 11/2009 Donoghue
7,631,270 B2 12/2009 Cunningham et al.
7,640,518 B2 12/2009 Forlines et al.
7,653,883 B2 1/2010 Hotelling et al.
7,657,849 B2 2/2010 Chaudhri et al.
7,663,607 B2 2/2010 Hotelling et al.
7,664,067 B2 2/2010 Pointer
7,671,756 B2 3/2010 Herz et al.
7,681,138 B2 3/2010 Grasser et al.
7,702,683 B1 4/2010 Kirshenbaum
7,730,425 B2 6/2010 de los Reyes et al.
7,746,388 B2 6/2010 Jeon
7,755,674 B2 7/2010 Kaminaga
7,782,332 B2 8/2010 Nagata
7,782,339 B1 8/2010 Hobbs et al.
7,792,876 B2 9/2010 Easwar
7,834,861 B2 11/2010 Lee
7,864,163 B2 * 1/2011 Ording .................. G06F 3/0488 345/173
7,877,707 B2 1/2011 Westerman et al.
7,880,728 B2 2/2011 De Los Reyes et al.
7,889,180 B2 2/2011 Byun et al.
7,895,309 B2 2/2011 Belali et al.
7,903,115 B2 3/2011 Platzer et al.
7,924,271 B2 4/2011 Christie et al.
7,933,632 B2 4/2011 Flynt et al.
7,962,281 B2 6/2011 Rasmussen et al.
7,983,718 B1 7/2011 Roka
7,987,431 B2 7/2011 Santoro et al.
8,006,276 B2 8/2011 Nakagawa et al.
8,074,174 B2 12/2011 Suzuki et al.
8,086,275 B2 12/2011 Wykes
8,108,781 B2 1/2012 Laansoo et al.
8,127,254 B2 2/2012 Lindberg et al.
8,130,226 B2 3/2012 Brunner et al.
8,131,808 B2 3/2012 Aoki et al.
8,150,924 B2 4/2012 Buchheit et al.
8,175,653 B2 5/2012 Smuga
8,200,779 B2 6/2012 Wei et al.
8,225,193 B1 7/2012 Kleinschnitz et al.
8,238,526 B1 8/2012 Seth et al.
8,238,876 B2 8/2012 Teng
8,245,152 B2 8/2012 Brunner et al.
8,250,494 B2 8/2012 Butcher
8,255,473 B2 8/2012 Eren et al.
8,255,812 B1 8/2012 Parparita et al.
8,266,550 B1 9/2012 Cleron et al.
8,269,736 B2 9/2012 Wilairat
8,280,901 B2 10/2012 McDonald
8,289,688 B2 10/2012 Behar et al.
8,294,715 B2 10/2012 Patel et al.
8,299,943 B2 10/2012 Longe
8,355,698 B2 1/2013 Teng et al.
8,385,952 B2 2/2013 Friedman et al.
8,402,384 B2 3/2013 Scott
8,411,046 B2 4/2013 Kruzeniski et al.
8,429,565 B2 4/2013 Agarawala et al.
8,448,083 B1 5/2013 Migos et al.
8,548,431 B2 10/2013 Teng et al.
8,564,461 B2 10/2013 Rubanovich et al.
8,634,876 B2 1/2014 Friedman
8,781,533 B2 7/2014 Wykes et al.
8,892,170 B2 11/2014 Teng et al.
8,914,072 B2 12/2014 Smuga et al.
8,970,499 B2 3/2015 Wykes et al.
9,760,272 B2 9/2017 Platzer et al.
2001/0015721 A1 8/2001 Byun et al.
2001/0022621 A1 9/2001 Squibbs
2002/0000963 A1 1/2002 Yoshida et al.
2002/0018051 A1 2/2002 Singh
2002/0026349 A1 2/2002 Reilly et al.
2002/0035607 A1 3/2002 Checkoway
2002/0054117 A1 5/2002 van Dantzich et al.
2002/0060701 A1 5/2002 Naughton et al.
2002/0070961 A1 6/2002 Xu et al.
2002/0077156 A1 6/2002 Smethers
2002/0091755 A1 7/2002 Narin
2002/0115476 A1 8/2002 Padawer et al.
2002/0128036 A1 9/2002 Yach et al.
2002/0129061 A1 9/2002 Swart et al.
2002/0138248 A1 9/2002 Corston-Oliver et al.
2002/0142762 A1 10/2002 Chmaytelli et al.
2002/0145631 A1 10/2002 Arbab et al.
2002/0152305 A1 10/2002 Jackson et al.
2002/0154176 A1 10/2002 Barksdale et al.
2002/0161634 A1 10/2002 Kaars
2002/0186251 A1 12/2002 Himmel et al.
2002/0194385 A1 12/2002 Linder et al.
2003/0003899 A1 1/2003 Tashiro et al.
2003/0008686 A1 1/2003 Park et al.
2003/0011643 A1 1/2003 Nishihihata
2003/0020671 A1 1/2003 Santoro et al.
2003/0040300 A1 2/2003 Bodic
2003/0046396 A1 3/2003 Richter et al.
2003/0073414 A1 4/2003 Capps
2003/0096604 A1 5/2003 Vollandt
2003/0105827 A1 6/2003 Tan et al.
2003/0135582 A1 7/2003 Allen et al.
2003/0187996 A1 10/2003 Cardina et al.
2003/0222907 A1 12/2003 Heikes et al.
2003/0225846 A1 12/2003 Heikes et al.
2003/0234799 A1 12/2003 Lee
2004/0015553 A1 1/2004 Griffin et al.
2004/0066414 A1 4/2004 Czerwinski et al.
2004/0068543 A1 4/2004 Seifert
2004/0078299 A1 4/2004 Down-Logan
2004/0111673 A1 6/2004 Bowman et al.
2004/0137884 A1 7/2004 Engstrom et al.
2004/0185883 A1 9/2004 Rukman
2004/0212586 A1 10/2004 Denny
2004/0217954 A1 11/2004 O'Gorman et al.
2004/0237048 A1 11/2004 Tojo et al.
2004/0250217 A1 12/2004 Tojo et al.
2005/0005241 A1 1/2005 Hunleth et al.
2005/0028208 A1 2/2005 Ellis
2005/0043065 A1 * 2/2005 Bekanich .............. H04M 15/70 455/566
2005/0044058 A1 2/2005 Matthews et al.
2005/0054384 A1 3/2005 Pasquale et al.
2005/0060647 A1 3/2005 Doan et al.

(56) References Cited

U.S. PATENT DOCUMENTS

2005/0060665 A1 3/2005 Rekimoto
2005/0079896 A1 4/2005 Kokko et al.
2005/0085215 A1 4/2005 Kokko
2005/0085272 A1 4/2005 Anderson et al.
2005/0108655 A1 5/2005 Andrea et al.
2005/0114788 A1 5/2005 Fabritius
2005/0143138 A1 6/2005 Lee et al.
2005/0179654 A1 8/2005 Hawkins
2005/0182798 A1 8/2005 Todd et al.
2005/0183021 A1 8/2005 Allen et al.
2005/0184999 A1 8/2005 Daioku
2005/0198159 A1 9/2005 Kirsch
2005/0198584 A1 9/2005 Matthews et al.
2005/0200762 A1 9/2005 Barletta et al.
2005/0216300 A1 9/2005 Appelman et al.
2005/0223057 A1 10/2005 Buchheit et al.
2005/0232166 A1 10/2005 Nierhaus
2005/0250547 A1 11/2005 Salman et al.
2005/0268237 A1 12/2005 Crane et al.
2005/0273614 A1 12/2005 Ahuja
2005/0280719 A1 12/2005 Kim
2006/0004685 A1 1/2006 Pyhalammi et al.
2006/0005207 A1 1/2006 Louch et al.
2006/0010394 A1 1/2006 Chaudhri et al.
2006/0015736 A1 1/2006 Callas et al.
2006/0015812 A1 1/2006 Cunningham
2006/0020904 A1 1/2006 Aaltonen et al.
2006/0025220 A1 2/2006 Macauley et al.
2006/0026013 A1 2/2006 Kraft
2006/0026521 A1 2/2006 Hotelling et al.
2006/0036425 A1 2/2006 Le Cocq et al.
2006/0048073 A1 3/2006 Jarrett et al.
2006/0048101 A1 3/2006 Krassovsky et al.
2006/0059430 A1 3/2006 Bells
2006/0070005 A1 3/2006 Gilbert et al.
2006/0070007 A1 3/2006 Cummins et al.
2006/0074735 A1 4/2006 Shukla et al.
2006/0074771 A1 4/2006 Kim
2006/0103623 A1 5/2006 Davis
2006/0112354 A1 5/2006 Park et al.
2006/0129543 A1 6/2006 Bates et al.
2006/0135220 A1 6/2006 Kim et al.
2006/0136773 A1 6/2006 Kespohl et al.
2006/0152803 A1 7/2006 Provitola
2006/0172724 A1 8/2006 Linkert et al.
2006/0173911 A1 8/2006 Levin et al.
2006/0184901 A1 8/2006 Dietz
2006/0190833 A1 8/2006 SanGiovanni et al.
2006/0199598 A1 9/2006 Lee et al.
2006/0206590 A1 9/2006 Wakasa et al.
2006/0212806 A1 9/2006 Griffin et al.
2006/0218234 A1 9/2006 Deng et al.
2006/0218501 A1 9/2006 Wilson et al.
2006/0246955 A1 11/2006 Nirhamo
2006/0253801 A1 11/2006 Okaro et al.
2006/0259870 A1 11/2006 Hewitt et al.
2006/0259873 A1 11/2006 Mister
2006/0262134 A1 11/2006 Hamiter et al.
2006/0268100 A1 11/2006 Karukka et al.
2006/0271520 A1 11/2006 Ragan
2006/0281448 A1 12/2006 Plestid et al.
2006/0293088 A1 12/2006 Kokubo
2006/0294063 A1 12/2006 Ali et al.
2006/0294396 A1 12/2006 Witman
2007/0005716 A1 1/2007 LeVasseur et al.
2007/0006094 A1 1/2007 Canfield et al.
2007/0011610 A1 1/2007 Sethi et al.
2007/0015532 A1 1/2007 Deelman
2007/0024646 A1 2/2007 Saarinen
2007/0035513 A1 2/2007 Sherrard et al.
2007/0038567 A1 2/2007 Allaire et al.
2007/0050337 A1 3/2007 Venkataraman et al.
2007/0050724 A1 3/2007 Lee et al.
2007/0054679 A1 3/2007 Cho et al.
2007/0061306 A1 3/2007 Pell et al.
2007/0061488 A1 3/2007 Alagappan et al.
2007/0061714 A1 3/2007 Stuple et al.
2007/0063995 A1 3/2007 Bailey et al.
2007/0067272 A1 3/2007 Flynt
2007/0073718 A1 3/2007 Ramer
2007/0076013 A1 4/2007 Campbell
2007/0079249 A1 4/2007 Pall et al.
2007/0080954 A1 4/2007 Griffin
2007/0082707 A1 4/2007 Flynt et al.
2007/0082708 A1 4/2007 Griffin
2007/0083821 A1 4/2007 Garbow et al.
2007/0106635 A1 5/2007 Frieden et al.
2007/0118801 A1 5/2007 Harshbarger et al.
2007/0120835 A1 5/2007 Sato
2007/0127638 A1 6/2007 Doulton
2007/0150826 A1 6/2007 Anzures et al.
2007/0150842 A1 6/2007 Chaudhri et al.
2007/0157089 A1 7/2007 Van Os et al.
2007/0162850 A1 7/2007 Adler et al.
2007/0171192 A1 7/2007 Seo et al.
2007/0171238 A1 7/2007 Ubillos et al.
2007/0182595 A1 8/2007 Ghasabian
2007/0182999 A1 8/2007 Anthony et al.
2007/0185847 A1 8/2007 Budzik et al.
2007/0192707 A1 8/2007 Maeda et al.
2007/0192708 A1 8/2007 Lee et al.
2007/0192730 A1 8/2007 Simila et al.
2007/0192733 A1 8/2007 Horiuchi
2007/0197196 A1 8/2007 Shenfield et al.
2007/0198420 A1 8/2007 Goldstein
2007/0208840 A1 9/2007 Mcconville et al.
2007/0211034 A1 9/2007 Griffin et al.
2007/0214422 A1 9/2007 Agarwal et al.
2007/0214429 A1 9/2007 Lyudovyk et al.
2007/0216651 A1 9/2007 Patel
2007/0216661 A1 9/2007 Chen et al.
2007/0225022 A1 9/2007 Satake
2007/0232342 A1 10/2007 Larocca
2007/0233654 A1 10/2007 Karlson
2007/0236468 A1 10/2007 Tuli
2007/0238488 A1 10/2007 Scott
2007/0247435 A1 10/2007 Benko et al.
2007/0250583 A1 10/2007 Hardy
2007/0250795 A1* 10/2007 Park ...................... G06F 3/0482 715/864
2007/0253758 A1 11/2007 Suess
2007/0255831 A1 11/2007 Hayashi et al.
2007/0256029 A1 11/2007 Maxwell
2007/0257891 A1 11/2007 Esenther et al.
2007/0257933 A1 11/2007 Klassen
2007/0260674 A1 11/2007 Shenfield
2007/0262964 A1 11/2007 Zotov et al.
2007/0263843 A1 11/2007 Foxenland
2007/0273663 A1 11/2007 Park et al.
2007/0273668 A1 11/2007 Park et al.
2007/0280457 A1 12/2007 Aberethy
2007/0281747 A1 12/2007 Pletikosa
2008/0005668 A1 1/2008 Mavinkurve
2008/0009272 A1 1/2008 Toledano
2008/0028294 A1 1/2008 Sell et al.
2008/0032681 A1 2/2008 West
2008/0036743 A1 2/2008 Westerman et al.
2008/0048986 A1 2/2008 Khoo
2008/0052370 A1 2/2008 Snyder
2008/0057910 A1 3/2008 Thoresson et al.
2008/0057926 A1 3/2008 Forstall et al.
2008/0066010 A1 3/2008 Brodersen et al.
2008/0068447 A1 3/2008 Mattila et al.
2008/0072173 A1 3/2008 Brunner et al.
2008/0076472 A1 3/2008 Hyatt
2008/0082934 A1 4/2008 Kocienda et al.
2008/0084970 A1 4/2008 Harper
2008/0085700 A1 4/2008 Arora
2008/0092054 A1 4/2008 Bhumkar et al.
2008/0092057 A1 4/2008 Monson et al.
2008/0094370 A1 4/2008 Ording et al.
2008/0102863 A1 5/2008 Hardy
2008/0104544 A1 5/2008 Collins et al.
2008/0107057 A1 5/2008 Kannan et al.

(56) References Cited

U.S. PATENT DOCUMENTS

2008/0113656 A1 5/2008 Lee et al.
2008/0114535 A1 5/2008 Nesbitt
2008/0120571 A1 5/2008 Chang et al.
2008/0122796 A1 5/2008 Jobs
2008/0132252 A1 6/2008 Altman et al.
2008/0141153 A1 6/2008 Samson et al.
2008/0153551 A1 6/2008 Baek et al.
2008/0155425 A1 6/2008 Murthy et al.
2008/0155437 A1 6/2008 Morris
2008/0162651 A1 7/2008 Madnani
2008/0163104 A1 7/2008 Haug
2008/0165132 A1 7/2008 Weiss
2008/0165136 A1 7/2008 Christie et al.
2008/0165141 A1 7/2008 Christie
2008/0165163 A1 7/2008 Bathiche
2008/0167058 A1 7/2008 Lee et al.
2008/0168290 A1 7/2008 Jobs et al.
2008/0168349 A1 7/2008 Lamiraux et al.
2008/0168379 A1 7/2008 Forstall et al.
2008/0168402 A1 7/2008 Blumenberg
2008/0168403 A1 7/2008 Westerman et al.
2008/0172609 A1 7/2008 Rytivaara
2008/0174570 A1 7/2008 Jobs et al.
2008/0180399 A1 7/2008 Cheng
2008/0182628 A1 7/2008 Lee et al.
2008/0184112 A1 7/2008 Chiang et al.
2008/0189653 A1 8/2008 Taylor et al.
2008/0189658 A1 8/2008 Jeong et al.
2008/0198141 A1 8/2008 Lee et al.
2008/0200142 A1 8/2008 Adbel-Kader et al.
2008/0208973 A1 8/2008 Hayashi
2008/0215980 A1 9/2008 Lee et al.
2008/0222273 A1 9/2008 Lakshmanan
2008/0222545 A1 9/2008 Lemay et al.
2008/0222547 A1 9/2008 Wong et al.
2008/0222560 A1 9/2008 Harrison
2008/0222569 A1 9/2008 Champion
2008/0242362 A1 10/2008 Duarte
2008/0250035 A1 10/2008 Smith et al.
2008/0259042 A1 10/2008 Thorn
2008/0261513 A1 10/2008 Shin et al.
2008/0261660 A1 10/2008 Huh et al.
2008/0263457 A1 10/2008 Kim et al.
2008/0270558 A1 10/2008 Ma
2008/0295017 A1* 11/2008 Tseng .................... G06F 3/0483 715/777
2008/0297475 A1 12/2008 Woolf et al.
2008/0299999 A1 12/2008 Lockhart et al.
2008/0301046 A1 12/2008 Martinez
2008/0301575 A1 12/2008 Fermon
2008/0307351 A1 12/2008 Louch et al.
2008/0307364 A1 12/2008 Chaudhri et al.
2008/0309626 A1 12/2008 Westerman et al.
2008/0316177 A1 12/2008 Tseng
2008/0317240 A1 12/2008 Chang et al.
2008/0320413 A1 12/2008 Oshiro
2009/0002332 A1 1/2009 Park et al.
2009/0007009 A1 1/2009 Luneau et al.
2009/0007017 A1 1/2009 Anzures et al.
2009/0012952 A1 1/2009 Fredriksson
2009/0019369 A1 1/2009 Borovsky et al.
2009/0029736 A1 1/2009 Kim et al.
2009/0031247 A1 1/2009 Walter et al.
2009/0037413 A1 2/2009 Castell et al.
2009/0037469 A1 2/2009 Kirsch
2009/0037846 A1 2/2009 Spalink et al.
2009/0051671 A1 2/2009 Konstas
2009/0058882 A1* 3/2009 Adachi ................. G06F 1/1622 345/650
2009/0061837 A1 3/2009 Chaudhri et al.
2009/0061948 A1 3/2009 Lee et al.
2009/0064055 A1 3/2009 Chaudhri
2009/0070673 A1 3/2009 Barkan et al.
2009/0070695 A1 3/2009 Oh et al.
2009/0077649 A1 3/2009 Lockhart
2009/0083656 A1 3/2009 Dokhon
2009/0083850 A1 3/2009 Fadell et al.
2009/0085851 A1 4/2009 Lim
2009/0085878 A1 4/2009 Heubel et al.
2009/0089215 A1 4/2009 Newton
2009/0094562 A1 4/2009 Jeong et al.
2009/0103515 A1 4/2009 Pointer
2009/0106694 A1 4/2009 Kraft et al.
2009/0106696 A1 4/2009 Duarte
2009/0109184 A1 4/2009 Kim
2009/0109243 A1 4/2009 Kraft
2009/0111447 A1 4/2009 Nurmi
2009/0117942 A1 5/2009 Boningue et al.
2009/0119606 A1 5/2009 Gilbert
2009/0140061 A1 6/2009 Schultz et al.
2009/0140986 A1 6/2009 Karkkainen et al.
2009/0144642 A1 6/2009 Crystal
2009/0144653 A1 6/2009 Ubillos
2009/0146962 A1 6/2009 Ahonen et al.
2009/0153492 A1 6/2009 Popp
2009/0160809 A1 6/2009 Yang
2009/0163182 A1 6/2009 Gatti et al.
2009/0164888 A1 6/2009 Phan
2009/0164928 A1 6/2009 Brown et al.
2009/0164936 A1 6/2009 Kawaguchi
2009/0170480 A1 7/2009 Lee
2009/0178007 A1 7/2009 Matas et al.
2009/0182788 A1 7/2009 Chung et al.
2009/0184939 A1 7/2009 Wohlstadter et al.
2009/0199122 A1 8/2009 Deutsch et al.
2009/0199128 A1 8/2009 Matthews et al.
2009/0199130 A1 8/2009 Tsern et al.
2009/0205041 A1 8/2009 Michalske
2009/0215504 A1 8/2009 Lando
2009/0228825 A1 9/2009 Van Os et al.
2009/0228841 A1 9/2009 Hildreth
2009/0235200 A1 9/2009 Deutsch et al.
2009/0235203 A1 9/2009 Iizuka
2009/0249247 A1 10/2009 Tseng et al.
2009/0249257 A1 10/2009 Bove et al.
2009/0259966 A1* 10/2009 Hara .................... G06F 3/0481 715/796
2009/0259971 A1 10/2009 Rankine et al.
2009/0265662 A1 10/2009 Bamford
2009/0271778 A1 10/2009 Mandyam et al.
2009/0284482 A1 11/2009 Chin
2009/0288032 A1 11/2009 Chang et al.
2009/0288044 A1 11/2009 Matthews et al.
2009/0292989 A1 11/2009 Matthews et al.
2009/0293007 A1 11/2009 Duarte et al.
2009/0293014 A1 11/2009 Meuninck et al.
2009/0298547 A1 12/2009 Kim et al.
2009/0303231 A1 12/2009 Robinet et al.
2009/0305732 A1 12/2009 Marcellino et al.
2009/0307105 A1 12/2009 Lemay et al.
2009/0307589 A1 12/2009 Inose et al.
2009/0307623 A1 12/2009 Agarawala et al.
2009/0313584 A1 12/2009 Kerr et al.
2009/0315839 A1 12/2009 Wilson et al.
2009/0315847 A1 12/2009 Fujii
2009/0328101 A1 12/2009 Suomela et al.
2010/0008490 A1 1/2010 Gharachorloo et al.
2010/0013782 A1 1/2010 Liu et al.
2010/0020025 A1 1/2010 Lemort et al.
2010/0020091 A1 1/2010 Rasmussen et al.
2010/0023871 A1 1/2010 Bederson et al.
2010/0031186 A1 2/2010 Tseng
2010/0035659 A1* 2/2010 Lin .................... H04M 1/0235 455/566
2010/0042911 A1 2/2010 Wormald et al.
2010/0050076 A1 2/2010 Roth
2010/0058248 A1 3/2010 Park
2010/0066698 A1 3/2010 Seo
2010/0070931 A1 3/2010 Nichols
2010/0075628 A1 3/2010 Ye
2010/0077058 A1 3/2010 Messer
2010/0077310 A1 3/2010 Karachale et al.
2010/0077330 A1 3/2010 Kaplan et al.
2010/0079413 A1 4/2010 Kawashima et al.

(56) References Cited

U.S. PATENT DOCUMENTS

2010/0081475 A1 4/2010 Chiang et al.
2010/0087169 A1 4/2010 Lin
2010/0087173 A1 4/2010 Lin
2010/0088634 A1 4/2010 Tsuruta et al.
2010/0088635 A1 4/2010 Louch
2010/0100839 A1 4/2010 Tseng et al.
2010/0103118 A1 4/2010 Townsend et al.
2010/0103124 A1 4/2010 Kruzeniski
2010/0105370 A1 4/2010 Kruzeniski
2010/0105424 A1 4/2010 Smuga
2010/0105438 A1 4/2010 Wykes
2010/0105439 A1 4/2010 Friedman et al.
2010/0105440 A1 4/2010 Kruzeniski
2010/0105441 A1 4/2010 Voss
2010/0106915 A1 4/2010 Krishnaprasad et al.
2010/0107067 A1 4/2010 Vaisanen
2010/0107068 A1 4/2010 Butcher
2010/0107100 A1 4/2010 Schneekloth
2010/0122110 A1 5/2010 Ordogh
2010/0138767 A1 6/2010 Wang et al.
2010/0145675 A1 6/2010 Lloyd et al.
2010/0146437 A1 6/2010 Woodcock et al.
2010/0159966 A1 6/2010 Friedman
2010/0159994 A1 6/2010 Stallings et al.
2010/0159995 A1 6/2010 Stallings et al.
2010/0162180 A1 6/2010 Dunnam et al.
2010/0167699 A1 7/2010 Sigmund et al.
2010/0169766 A1 7/2010 Duarte et al.
2010/0169772 A1 7/2010 Stallings et al.
2010/0175018 A1 7/2010 Petschnigg et al.
2010/0175029 A1 7/2010 Williams
2010/0180233 A1 7/2010 Kruzeniski
2010/0216491 A1 8/2010 Winkler et al.
2010/0248688 A1 9/2010 Teng
2010/0248689 A1 9/2010 Teng
2010/0248741 A1 9/2010 Setlur et al.
2010/0248787 A1 9/2010 Smuga
2010/0265196 A1 10/2010 Lee et al.
2010/0281402 A1 11/2010 Staikos et al.
2010/0281409 A1 11/2010 Rainisto et al.
2010/0283743 A1 11/2010 Coddington et al.
2010/0289806 A1 11/2010 Lao et al.
2010/0293056 A1 11/2010 Flynt et al.
2010/0295795 A1 11/2010 Wilairat
2010/0298034 A1 11/2010 Shin et al.
2010/0302172 A1 12/2010 Wilairat
2010/0302278 A1 12/2010 Shaffer et al.
2010/0302712 A1 12/2010 Wilairat
2010/0311470 A1 12/2010 Seo et al.
2010/0313165 A1 12/2010 Louch et al.
2010/0321403 A1 12/2010 Inadome
2010/0328431 A1 12/2010 Kim et al.
2010/0333008 A1 12/2010 Taylor
2011/0004839 A1 1/2011 Cha et al.
2011/0004845 A1 1/2011 Ciabarra
2011/0018806 A1 1/2011 Yano
2011/0029598 A1 2/2011 Arnold et al.
2011/0029904 A1 2/2011 Smith et al.
2011/0029934 A1 2/2011 Locker et al.
2011/0043527 A1 2/2011 Ording et al.
2011/0055773 A1 3/2011 Agarawala et al.
2011/0074699 A1 3/2011 Marr et al.
2011/0074710 A1 3/2011 Weeldreyer et al.
2011/0074719 A1 3/2011 Yeh et al.
2011/0093778 A1 4/2011 Kim et al.
2011/0093816 A1 4/2011 Chang et al.
2011/0093821 A1 4/2011 Wigdor et al.
2011/0107272 A1 5/2011 Aguilar
2011/0113337 A1 5/2011 Liu et al.
2011/0113486 A1 5/2011 Hunt et al.
2011/0119586 A1 5/2011 Blinnikka et al.
2011/0154235 A1 6/2011 Min et al.
2011/0157027 A1 6/2011 Rissa
2011/0161845 A1 6/2011 Stallings et al.
2011/0163968 A1 7/2011 Hogan
2011/0173556 A1 7/2011 Czerwinski et al.
2011/0173568 A1 7/2011 Royal, Jr. et al.
2011/0175930 A1 7/2011 Hwang et al.
2011/0225547 A1 9/2011 Fong et al.
2011/0231796 A1 9/2011 Vigil
2011/0252380 A1 10/2011 Chaudhri
2012/0028687 A1 2/2012 Wykes
2012/0050185 A1 3/2012 Davydov et al.
2012/0050332 A1 3/2012 Nikara et al.
2012/0102433 A1 4/2012 Falkenburg
2012/0151397 A1 6/2012 Oberstein et al.
2012/0159395 A1 6/2012 Deutsch et al.
2012/0159402 A1 6/2012 Nurmi et al.
2012/0167008 A1 6/2012 Zaman
2012/0167011 A1 6/2012 Zaman
2012/0174005 A1 7/2012 Deutsch et al.
2012/0174029 A1 7/2012 Bastide et al.
2012/0179992 A1 7/2012 Smuga
2012/0210265 A1 8/2012 Delia et al.
2012/0212495 A1 8/2012 Butcher
2012/0216139 A1 8/2012 Ording et al.
2012/0233571 A1 9/2012 Wever et al.
2012/0244841 A1 9/2012 Teng
2012/0254780 A1 10/2012 Mouton et al.
2012/0265644 A1 10/2012 Roa et al.
2012/0290962 A1 11/2012 Zielinski et al.
2012/0299968 A1 11/2012 Wong et al.
2012/0304068 A1 11/2012 Zaman et al.
2012/0304092 A1 11/2012 Jarrett et al.
2012/0304108 A1 11/2012 Jarrett et al.
2012/0304113 A1 11/2012 Patten et al.
2012/0304114 A1 11/2012 Wong et al.
2012/0304116 A1 11/2012 Donahue et al.
2012/0304117 A1 11/2012 Donahue et al.
2012/0304118 A1 11/2012 Donahue et al.
2012/0311485 A1 12/2012 Caliendo, Jr. et al.
2012/0323992 A1 12/2012 Brobst et al.
2013/0033525 A1 2/2013 Markiewicz et al.
2013/0042203 A1 2/2013 Wong et al.
2013/0042206 A1 2/2013 Zaman et al.
2013/0044141 A1 2/2013 Markiewicz et al.
2013/0047105 A1 2/2013 Jarrett
2013/0047117 A1 2/2013 Deutsch
2013/0057587 A1 3/2013 Leonard et al.
2013/0057588 A1 3/2013 Leonard
2013/0063442 A1 3/2013 Zaman
2013/0063443 A1 3/2013 Garside
2013/0063465 A1 3/2013 Zaman
2013/0063490 A1 3/2013 Zaman et al.
2013/0067381 A1 3/2013 Yalovsky
2013/0067390 A1 3/2013 Kwiatkowski
2013/0067391 A1 3/2013 Pittappilly
2013/0067398 A1 3/2013 Pittappilly
2013/0067399 A1 3/2013 Elliott
2013/0067412 A1 3/2013 Leonard et al.
2013/0067420 A1 3/2013 Pittappilly
2013/0093757 A1 4/2013 Cornell
2013/0102366 A1 4/2013 Teng
2014/0068446 A1 3/2014 Friedman
2014/0094226 A1 4/2014 Friedman
2014/0109005 A1 4/2014 Kruzeniski
2014/0320415 A1 10/2014 Wykes et al.
2015/0169079 A1 6/2015 Wykes et al.

FOREIGN PATENT DOCUMENTS

CN 1936797 3/2007
CN 101047656 10/2007
CN 101127736 2/2008
CN 101228570 7/2008
CN 101296457 10/2008
CN 101308440 11/2008
CN 101311891 11/2008
CN 102197702 9/2011
EP 0583060 2/1994
EP 1469375 10/2004
EP 1752868 2/2007
EP 1959338 8/2008
JP H03246614 11/1991

(56) References Cited

FOREIGN PATENT DOCUMENTS

| | | |
|---|---|---|
| JP | H06242886 | 9/1994 |
| JP | H0897887 | 4/1996 |
| JP | 2001125913 | 5/2001 |
| JP | 2002229906 | 8/2002 |
| JP | 2003076460 | 3/2003 |
| JP | 2004227393 | 8/2004 |
| JP | 2004357257 | 12/2004 |
| JP | 2005517240 | 6/2005 |
| JP | 2005242661 | 9/2005 |
| JP | 2005539432 | 12/2005 |
| JP | 2006139615 | 6/2006 |
| JP | 2006163647 | 6/2006 |
| JP | 2007141249 | 6/2007 |
| JP | 2007243275 | 9/2007 |
| JP | 2007527065 | 9/2007 |
| JP | 2007258893 | 10/2007 |
| JP | 2008148054 | 6/2008 |
| JP | 2008204210 | 9/2008 |
| JP | 2008217808 | 9/2008 |
| JP | 2008536196 | 9/2008 |
| JP | 2008257442 | 10/2008 |
| JP | 2009015457 | 1/2009 |
| JP | 2009522666 | 6/2009 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 10200800259551 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 1020090041635 | 4/2009 |
| KR | 20100010072 | 2/2010 |
| KR | 20100048375 | 5/2010 |
| KR | 20100056369 | 5/2010 |
| KR | 1020100056369 | 5/2010 |
| RU | 2254611 | 1/2005 |
| RU | 2308076 | 10/2007 |
| RU | 2345425 | 1/2009 |
| RU | 2347261 | 2/2009 |
| TW | 200404444 | 3/2004 |
| TW | 200828096 | 7/2008 |
| TW | 201023026 | 6/2010 |
| WO | WO-9926127 | 5/1999 |
| WO | WO-03062976 | 7/2003 |
| WO | WO-2003091034 | 11/2003 |
| WO | WO-2004097680 | 11/2004 |
| WO | WO-2005026931 | 3/2005 |
| WO | WO-2005027506 | 3/2005 |
| WO | WO-2006019639 | 2/2006 |
| WO | WO-2007030396 | 3/2007 |
| WO | WO-2007099424 | 9/2007 |
| WO | WO-2007121557 | 11/2007 |
| WO | WO-2007134623 | 11/2007 |
| WO | WO-2008030608 | 3/2008 |
| WO | WO-2008030976 | 3/2008 |
| WO | WO-2008031871 | 3/2008 |
| WO | WO-2008035831 | 3/2008 |
| WO | WO-2008104862 | 9/2008 |
| WO | WO-2008146784 | 12/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010135155 | 11/2010 |
| WO | WO-2011041885 | 4/2011 |

OTHER PUBLICATIONS

"Corrected Notice of Allowance", U.S. Appl. No. 14/330,221, dated Feb. 2, 2015, 2 pages.

"Foreign Office Action", RU Application No. 2011151097, dated Dec. 9, 2014, 7 pages.

Office Action from a counterpart Canada Patent Application No. 2,753,686, dated Mar. 31, 2016, 4 pages.

"Extended European Search Report", EP Application No. 10778152.8, dated Apr. 14, 2015, 7 pages.

"Final Office Action", U.S. Appl. No. 13/461,656, dated May 7, 2015, 24 pages.

"Foreign Notice of Allowance", RU Application No. 2011151097, dated Feb. 26, 2015, 16 pages.

"Foreign Office Action", CN Application No. 201080027409.2, dated Apr. 20, 2015, 14 Pages.

"Foreign Office Action", EP Application No. 10790080.5, dated May 18, 2015, 6 Pages.

"Foreign Office Action", IL Application No. 214804, dated Mar. 12, 2015, 6 Pages.

"Non-Final Office Action", U.S. Appl. No. 13/776,533, dated May 19, 2015, 52 pages.

"Supplementary European Search Report", EP Application No. 10790080.5, dated Apr. 21, 2015, 3 pages.

Office Action (no English translation) received in counterpart Israel Application No. 214804, dated Jun. 20, 2016, 2 pages.

English Translation of Office Action received in counterpart Israel Application No. 214804, dated Jun. 20, 2016, 2 pages (Office Action cited in prior IDS).

"Foreign Office Action", IL Application No. 215757, dated May 18, 2015, 6 Pages.

"Foreign Office Action", TW Application No. 98135986, dated Jun. 10, 2015, 13 Pages.

"Non-Final Office Action", U.S. Appl. No. 13/835,603, dated Jun. 26, 2015, 8 pages.

"Notice of Allowance", U.S. Appl. No. 12/560,081, dated Aug. 10, 2015, 15 pages.

Notice of Allowance and allowed claims (w/English translation) received in a counterpart Korean Patent Application No. 10-2011-7022964, dated Jul. 27, 2016, 11 pages.

"Foreign Notice of Allowance", AU Application No. 2010234909, dated May 2, 2014, 3 pages.

"(Need English Translation) Notice of Allowance", JP Application No. 2012-516218, dated Nov. 4, 2014, 3 Pages.

"Adobe Acrobat 8 Standard User Guide", Adobe Systems Incorporated, 2007, pp. 34 & 36.

"Advisory Action", U.S. Appl. No. 12/414,382, dated Jan. 20, 2012, 3 pages.

"Advisory Action", U.S. Appl. No. 12/433,605, dated Apr. 5, 2012, 3 pages.

"Alltel Adds Dedicated Search Key to Phones", Retrieved from: <http://www.phonescoop.com/news/item.php?n=2159> on Nov. 26, 2008., Apr. 12, 2007, 2 Pages.

"Android 2.3 User's Guide", AUG-2.3-103, Android mobile technology platform 2.3, Dec. 13, 2010, 380 pages.

"Apple iPhone—8GB AT&T", Retrieved from: <http://nytimes.com.com/smartphones/apple-iphone-8gb-at/4515-6452_7-32309245.html> on Nov. 20, 2008, Jun. 29, 2007, 11 pages.

"Application User Model IDs", Retrieved from: <http://msdn.microsoft.com/en-us/library/dd378459(VS.85).aspx> on Sep. 28, 2010, 2010, 6 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009, Nov. 11, 2008, 3 pages.

"Basics of Your Device: Get Familiar with the Home Screen", Nokia USA—How to—retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, Nov. 20, 2008, 1 page.

(56) References Cited

OTHER PUBLICATIONS

"Calc4M", Retrieved from: <http://www.hellebo.com/Calc4M.html> on Dec. 11, 2008, Sep. 10, 2008, 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.
"Corrected Notice of Allowance", U.S. Appl. No. 13/270,111, dated Jun. 17, 2014, 2 pages.
"Corrected Notice of Allowance", U.S. Appl. No. 13/270,111, dated Jun. 23, 2014, 3 pages.
"Dial a number", Retrieved from: <http://www.phonespell.org/ialhelp.html> on Nov. 20, 2008, Nov. 20, 2008, 1 page.
"DuoSense™ Multi-Touch Gestures", Retrieved from: <http://www.n-trig.com/Data/Uploads/Misc/DuoSenseMTG_final.pdf>, Jul. 2008, 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009, Mar. 13, 2009, 2 pages.
"Email Notification for Microsoft Outlook and Outlook Express", Retrieved from: <http://www.contextmagic.com/express-notification/> on Sep. 29, 2010, Jul. 21, 2004, 3 pages.
"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>, Apr. 8, 2008, pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.
"Extended European Search Report", EP Application No. 09818253.8, Apr. 10, 2012, 7 pages.
"Extended European Search Report", EP Application No. 09822736.6, Dec. 18, 2012, 7 pages.
"Extended European Search Report", EP Application No. 10762112.0, Aug. 2, 2013, 7 Pages.
"Extended European Search Report", EP Application No. 10762120.3, Aug. 22, 2014, 9 pages.
"EXtreme Energy Conservation: Advanced Power-Saving Software for Wireless Devices", White Paper, Freescale Semiconductor, Inc., Document No. XTMENRYGYCNSVWP, Rev #0, available at <http://www.freescale.com/files/32bit/doc/white_paper/XTMENRGYCNSVWP.pdf>, Feb. 2006, 15 pages.
"Final Office Action", U.S. Appl. No. 11/305,789, dated Apr. 1, 2009, 10 pages.
"Final Office Action", U.S. Appl. No. 11/502,264, dated Feb. 4, 2010, 15 pages.
"Final Office Action", U.S. Appl. No. 11/502,264, dated Mar. 29, 2013, 16 pages.
"Final Office Action", U.S. Appl. No. 11/502,264, dated Apr. 3, 2009, 9 pages.
"Final Office Action", U.S. Appl. No. 12/244,545, dated May 6, 2014, 24 pages.
"Final Office Action", U.S. Appl. No. 12/244,545, dated Dec. 7, 2011, 16 pages.
"Final Office Action", U.S. Appl. No. 12/244,545, dated Sep. 7, 2012, 23 pages.
"Final Office Action", U.S. Appl. No. 12/413,977, dated Nov. 17, 2011, 16 pages.
"Final Office Action", U.S. Appl. No. 12/414,382, dated Dec. 23, 2011, 7 pages.
"Final Office Action", U.S. Appl. No. 12/414,476, dated Apr. 8, 2013, 25 pages.
"Final Office Action", U.S. Appl. No. 12/414,476, dated Apr. 24, 2014, 19 pages.
"Final Office Action", U.S. Appl. No. 12/414,476, dated Dec. 1, 2011, 20 pages.
"Final Office Action", U.S. Appl. No. 12/433,605, dated Jul. 17, 2013, 13 pages.
"Final Office Action", U.S. Appl. No. 12/433,605, dated Feb. 3, 2012, 11 pages.
"Final Office Action", U.S. Appl. No. 12/433,667, dated Jan. 7, 2013, 17 pages.
"Final Office Action", U.S. Appl. No. 12/433,667, dated Sep. 13, 2011, 17 pages.
"Final Office Action", U.S. Appl. No. 12/469,458, dated Feb. 1, 2013, 19 pages.
"Final Office Action", U.S. Appl. No. 12/469,458, dated Oct. 11, 2013, 24 pages.
"Final Office Action", U.S. Appl. No. 12/469,458, dated Nov. 17, 2011, 15 pages.
"Final Office Action", U.S. Appl. No. 12/469,480, dated Apr. 10, 2013, 21 pages.
"Final Office Action", U.S. Appl. No. 12/469,480, dated Dec. 5, 2013, 24 pages.
"Final Office Action", U.S. Appl. No. 12/469,480, dated Feb. 9, 2012, 17 pages.
"Final Office Action", U.S. Appl. No. 12/480,969, dated Feb. 21, 2014, 21 pages.
"Final Office Action", U.S. Appl. No. 12/480,969, dated Nov. 23, 2012, 18 pages.
"Final Office Action", U.S. Appl. No. 12/480,969, dated Jul. 24, 2013, 19 pages.
"Final Office Action", U.S. Appl. No. 12/484,799, dated Apr. 30, 2012, 13 pages.
"Final Office Action", U.S. Appl. No. 12/560,081, dated Aug. 25, 2014, 27 pages.
"Final Office Action", U.S. Appl. No. 12/560,081, dated Mar. 14, 2012, 16 pages.
"Final Office Action", U.S. Appl. No. 13/418,884, dated Dec. 30, 2013, 8 pages.
"Final Office Action", U.S. Appl. No. 13/655,386, dated Jun. 6, 2013, 34 pages.
"Final Office Action", U.S. Appl. No. 13/656,354, dated Jun. 17, 2013, 14 pages.
"Final Office Action", U.S. Appl. No. 13/657,646, dated May 6, 2013, 12 pages.
"Final Office Action", U.S. Appl. No. 13/657,789, dated Jun. 21, 2013, 35 pages.
"Floating Layer", Retrieved from <http://web.archive.org/web/20011025040032/http://www.echoecho.com/toolfloatinglayer.htm> on Apr. 15, 2014, Oct. 25, 2001, 9 pages.
"Foreign Office Action", CN Application No. 200980142644.1, dated Aug. 20, 2013, 9 Pages.
"Foreign Office Action", CN Application No. 200980142661.5, dated Sep. 24, 2013, 8 Pages.
"Foreign Office Action", CN Application No. 201080015728.1, dated Oct. 29, 2013, 8 Pages.
"Foreign Office Action", CN Application No. 201080015802.X, dated Sep. 29, 2013, 11 Pages.
"Foreign Office Action", JP Application No. 2011-530109, dated Jul. 18, 2013, 4 Pages.
"Foreign Office Action", JP Application No. 2011-533353, dated Jul. 5, 2013, 9 Pages.
"Foreign Notice of Allowance", CN Application No. 201080015802.X, dated Sep. 10, 2014, 6 Pages.
"Foreign Notice of Allowance", JP Application No. 2012-503523, dated Oct. 24, 2013, 4 pages.
"Foreign Notice of Allowance", JP Application No. 2012-511905, dated Sep. 24, 2014, 4 pages.
"Foreign Notice of Allowance", RU Application No. 2011147058, dated May 23, 2014, 13 pages.
"Foreign Office Action", AU Application No. 2010234909, dated Mar. 17, 2014, 4 Pages.
"Foreign Office Action", AU Application No. 2010260165, dated Mar. 25, 2014, 3 Pages.
"Foreign Office Action", AU Application No. 2010260165, dated May 1, 2014, 3 Pages.

(56) References Cited

OTHER PUBLICATIONS

"Foreign Office Action", CN Application No. 2379-2011, dated Jul. 3, 2013, 8 pages.
"Foreign Office Action", CN Application No. 200980139831.4, dated Mar. 24, 2014, 9 Pages.
"Foreign Office Action", CN Application No. 200980139831.4, dated Oct. 10, 2014, 10 Pages.
"Foreign Office Action", CN Application No. 200980139831.4, dated Jul. 1, 2013, 12 pages.
"Foreign Office Action", CN Application No. 200980142632.9, dated Jun. 14, 2013, 6 pages.
"Foreign Office Action", CN Application No. 200980142632.9, dated Jan. 29, 2013, 11 pages.
"Foreign Office Action", CN Application No. 200980142644.1, dated Mar. 5, 2014, 7 Pages.
"Foreign Office Action", CN Application No. 200980142644.1, dated Apr. 3, 2013, 10 pages.
"Foreign Office Action", CN Application No. 200980142661.5, dated Jan. 21, 2013, 12 pages.
"Foreign Office Action", CN Application No. 201080015728.1, dated May 16, 2013, 10 pages.
"Foreign Office Action", CN Application No. 201080015728.1, dated Dec. 26, 2012, 9 pages.
"Foreign Office Action", CN Application No. 201080015788.3, dated Jun. 5, 2013, 12 Pages.
"Foreign Office Action", CN Application No. 201080015788.3, dated Dec. 24, 2012, 10 pages.
"Foreign Office Action", CN Application No. 201080015802.X, dated May 19, 2014, 7 Pages.
"Foreign Office Action", CN Application No. 201080023212.1, dated Dec. 5, 2012, 10 pages.
"Foreign Office Action", CN Application No. 201080023212.1, dated Jun. 5, 2013, 8 pages.
"Foreign Office Action", CN Application No. 201080027409.2, dated Aug. 5, 2014, 12 Pages.
"Foreign Office Action", JP Application No. 2012-511905, dated Jan. 28, 2014, 6 Pages.
"Foreign Office Action", JP Application No. 2011-530109, dated May 2, 2014, 4 Pages.
"Foreign Office Action", JP Application No. 2011-533280, dated Nov. 26, 2013, 4 Pages.
"Foreign Office Action", JP Application No. 2011-533353, dated Nov. 26, 2013, 4 pages.
"Foreign Office Action", JP Application No. 2012-503514, dated Aug. 7, 2013, 5 pages.
"Foreign Office Action", JP Application No. 2012-503515, dated Nov. 18, 2013, 5 Pages.
"Foreign Office Action", JP Application No. 2012-503523, dated Apr. 22, 2013, 5 Pages.
"Foreign Office Action", JP Application No. 2012-516218, dated Mar. 6, 2014, 6 Pages.
"Foreign Office Action", MX Application No. MX/a/2011/012279, dated Jul. 4, 2013, 3 Pages.
"Foreign Office Action", RU Application No. 2011147058, dated Feb. 12, 2014, 7 Pages.
"Freeware.mobi", Retrieved from: <http://www.palmfreeware.mobi/download-palette.html> on Nov. 6, 2008, Oct. 9, 2001, 2 pages.
"GnomeCanvas", Retrieved from: <http://library.gnome.org/devel/libgnomecanvas/unstable/GnomeCanvas.html> on Sep. 28, 2010, 11 pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.
"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"HTC Shows HTC Snap with Snappy Email Feature", Retrieved from: <http://www.wirelessandmobilenews.com/smartphones/ on May 5, 2009>, May 4, 2009, 10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"Intent to Grant", EP Application No. 10762112.0, dated Aug. 28, 2014, 5 Pages.
"International Search Report and Written Opinion", Application No. PCT/US2010/028555, dated Oct. 12, 2010, 10 pages.
"International Search Report and Written Opinion", Application No. PCT/US2010/028699, dated Oct. 4, 2010, 10 pages.
"International Search Report and Written Opinion", Application No. PCT/US2011/067075, dated Dec. 12, 2012, 10 pages.
"International Search Report and Written Opinion", Application No. PCT/US2009/061864, dated May 14, 2010, 10 pages.
"International Search Report and Written Opinion", Application No. PCT/US2009/061382, dated May 26, 2010, 10 pages.
"International Search Report and Written Opinion", Application No. PCT/US2011/055725, dated Sep. 27, 2012, 10 pages.
"International Search Report and Written Opinion", Application No. PCT/US2009/061735, dated Jun. 7, 2010, 11 pages.
"International Search Report and Written Opinion", Application No. PCT/US2010/034772, dated Dec. 29, 2010, 12 pages.
"International Search Report and Written Opinion", Application No. PCT/US2012/047091, dated Dec. 27, 2012, 15 pages.
"International Search Report and Written Opinion", Application No. PCT/US2010/038730, dated Jan. 19, 2011, 8 pages.
"International Search Report and Written Opinion", Application No. PCT/US2011/055513, dated Mar. 27, 2012, 8 pages.
"International Search Report and Written Opinion", Application No. PCT/US2011/055514, dated May 22, 2012, 8 pages.
"International Search Report and Written Opinion", Application No. PCT/US2011/055512, dated May 24, 2012, 8 pages.
"International Search Report and Written Opinion", Application No. PCT/US2011/055520, dated May 9, 2012, 8 pages.
"International Search Report and Written Opinion", Application No. PCT/US2011/055524, dated Jun. 1, 2012, 8 pages.
"International Search Report and Written Opinion", Application No. PCT/US2011/065702, dated Aug. 29, 2012, 8 pages.
"International Search Report and Written Opinion", Application No. PCT/US2011/055736, dated Sep. 17, 2012, 8 pages.
"International Search Report and Written Opinion", Application No. PCT/US2011/067073, dated Sep. 17, 2012, 8 pages.
"International Search Report and Written Opinion", Application No. PCT/US2011/055511, dated Apr. 24, 2012, 9 pages.
"International Search Report and Written Opinion", Application No. PCT/US2011/055523, dated May 10, 2012, 9 pages.
"International Search Report and Written Opinion", Application No. PCT/US2011/055521, dated May 15, 2012, 9 pages.
"International Search Report and Written Opinion", Application No. PCT/US2011/055522, dated May 15, 2012, 9 pages.
"International Search Report and Written Opinion", Application No. PCT/US2011/055496, dated Sep. 12, 2012, 9 pages.
"International Search Report and Written Opinion", Application No. PCT/US2011/055712, dated Sep. 21, 2012, 9 pages.
"International Search Report and Written Opinion", Application No. PCT/US2011/055493, dated Sep. 26, 212, 9 pages.
"International Search Report and Written Opinion", Application No. PCT/US2011/055478, dated Sep. 27, 2012, 9 pages.
"International Search Report and Written Opinion", Application No. PCT/US2011/055746, dated Sep. 27, 2012, 9 pages.
"International Search Report and Written Opinion", Application No. PCT/US2010/028553, dated Mar. 24. 2010, Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.

(56) References Cited

OTHER PUBLICATIONS

"Introducing Application Styling for Windows Forms", Infragistics Software Manual, Version 7.3.20073.1043, Nov. 2007, 95 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"IPad User Guide", retrieved from <http://cyndidannerkuhn.info/CDK/iPads_Resources_files/iPad_User_Guide.pdf> on Jun. 17, 2011, 154 pages.
"IPod touch User Guide for iPhone OS 3.0 Software", Apple Inc., 2009, 153 pages.
"Keyboard (5)", Retrieved from: <http://landru.uwaterloo.ca/cgi-bin/man.cgi?section=5&topic=keyboard> on Dec. 11, 2009., Aug. 11, 1997, 8 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009, Nov. 2005, 5 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x, Aug. 16, 2007, 2 pages.
"Live Photo Gallery—Getting Started—from Camera to Panorama", Retrieved from: <http://webdotwiz.spaces.live.com/blog/cns/27827607521393233!1729.entry> on May 5, 2009., Sep. 2008, 7 Pages.
"Magic mouse", Retrieved from: <http://www.apple.com/magicmouse/> on May 10, 2011, 3 pages.
"MIDTB Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"moGo beta v.0.4", Retrieved from: <http://forum.xda-developers.com/showthread.php?t=375196> on Sep. 27, 2010, Mar. 7, 2008, 10 pages.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorII/system-monitorII.html> on Mar. 12, 2013, Jun. 8, 2010, 5 pages.
"New Features in WhatsUp Gold v12.0", retrieved from <http://www.netbright.co.th/?name=product&file=readproduct&id=12> on Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 11/215,052, dated Jun. 23, 2011, 17 pages.
"Non-Final Office Action", U.S. Appl. No. 11/305,789, dated Sep. 21, 2009, 5 pages.
"Non-Final Office Action", U.S. Appl. No. 11/502,264, dated Sep. 30, 2009, 15 pages.
"Non-Final Office Action", U.S. Appl. No. 11/502,264, dated Sep. 14, 2012, 14 pages.
"Non-Final Office Action", U.S. Appl. No. 12/244,545, dated Dec. 19, 2013, 22 pages.
"Non-Final Office Action", U.S. Appl. No. 12/244,545, dated Mar. 27, 2012, 18 pages.
"Non-Final Office Action", U.S. Appl. No. 12/244,545, dated Aug. 17, 2011, 15 pages.
"Non-Final Office Action", U.S. Appl. No. 12/413,977, dated Jul. 19, 2011, 17 pages.
"Non-Final Office Action", U.S. Appl. No. 12/413,977, dated Jul. 20, 2012, 18 pages.
"Non-Final Office Action", U.S. Appl. No. 12/414,382, dated Jul. 26, 2011, 9 pages.
"Non-Final Office Action", U.S. Appl. No. 12/414,434, dated Jan. 17, 2012, 7 pages.
"Non-Final Office Action", U.S. Appl. No. 12/414,434, dated May 31, 2012, 7 pages.
"Non-Final Office Action", U.S. Appl. No. 12/414,434, dated Aug. 2, 2011, 6 pages.
"Non-Final Office Action", U.S. Appl. No. 12/414,455, dated Aug. 29, 2011, 8 pages.
"Non-Final Office Action", U.S. Appl. No. 12/414,458, dated Jul. 6, 2011, 8 pages.
"Non-Final Office Action", U.S. Appl. No. 12/414,476, dated Oct. 25, 2013, 18 pages.
"Non-Final Office Action", U.S. Appl. No. 12/414,476, dated Nov. 9, 2012, 22 pages.
"Non-Final Office Action", U.S. Appl. No. 12/414,476, dated Aug. 3, 2011, 21 pages.
"Non-Final Office Action", U.S. Appl. No. 12/433,605, dated Jan. 11, 2013, 7 pages.
"Non-Final Office Action", U.S. Appl. No. 12/433,605, dated Nov. 6, 2013, 16 pages.
"Non-Final Office Action", U.S. Appl. No. 12/433,605, dated Jun. 24, 2011, 10 pages.
"Non-Final Office Action", U.S. Appl. No. 12/433,667, dated Jun. 7, 2011, 15 pages.
"Non-Final Office Action", U.S. Appl. No. 12/433,667, dated Feb. 3, 2012, 16 pages.
"Non-Final Office Action", U.S. Appl. No. 12/469,419, dated Nov. 9, 2011, 15 pages.
"Non-Final Office Action", U.S. Appl. No. 12/469,419, dated May 23, 2012, 13 pages.
"Non-Final Office Action", U.S. Appl. No. 12/469,458, dated May 3, 2013, 21 pages.
"Non-Final Office Action", U.S. Appl. No. 12/469,458, dated Jul. 1, 2011, 15 pages.
"Non-Final Office Action", U.S. Appl. No. 12/469,458, dated Sep. 21, 2012, 14 pages.
"Non-Final Office Action", U.S. Appl. No. 12/469,480, dated Aug. 27, 2013, 22 pages.
"Non-Final Office Action", U.S. Appl. No. 12/469,480, dated Oct. 17, 2012, 16 pages.
"Non-Final Office Action", U.S. Appl. No. 12/469,480, dated Sep. 22, 2011, 14 pages.
"Non-Final Office Action", U.S. Appl. No. 12/470,558, dated Nov. 22, 2011, 9 pages.
"Non-Final Office Action", U.S. Appl. No. 12/480,969, dated Apr. 4, 2013, 22 pages.
"Non-Final Office Action", U.S. Appl. No. 12/480,969, dated Oct. 29, 2013, 22 pages.
"Non-Final Office Action", U.S. Appl. No. 12/480,969, dated Aug. 7, 2012, 15 pages.
"Non-Final Office Action", U.S. Appl. No. 12/484,799, dated Aug. 11, 2011, 12 pages.
"Non-Final Office Action", U.S. Appl. No. 12/484,799, dated Aug. 7, 2012, 13 pages.
"Non-Final Office Action", U.S. Appl. No. 12/484,845, dated Dec. 7, 2011, 16 pages.
"Non-Final Office Action", U.S. Appl. No. 12/560,081, dated Apr. 30, 2014, 25 pages.
"Non-Final Office Action", U.S. Appl. No. 12/560,081, dated Dec. 7, 2011, 16 pages.
"Non-Final Office Action", U.S. Appl. No. 12/972,967, dated Jan. 30, 2013, 19 pages.
"Non-Final Office Action", U.S. Appl. No. 12/977,584, dated Dec. 7, 2012, 8 pages.
"Non-Final Office Action", U.S. Appl. No. 12/978,184, dated Jan. 23, 2013, 7 pages.
"Non-Final Office Action", U.S. Appl. No. 12/983,106, dated Nov. 9, 2012, 17 pages.
"Non-Final Office Action", U.S. Appl. No. 13/073,300, dated Jul. 25, 2013, 13 pages.
"Non-Final Office Action", U.S. Appl. No. 13/118,204, dated Feb. 28, 2013, 13 pages.

(56) References Cited

OTHER PUBLICATIONS

"Non-Final Office Action", U.S. Appl. No. 13/118,257, dated Mar. 5, 2013, 19 pages.
"Non-Final Office Action", U.S. Appl. No. 13/118,321, dated Jun. 10, 2013, 32 pages.
"Non-Final Office Action", U.S. Appl. No. 13/118,333, dated Jul. 5, 2013, 18 pages.
"Non-Final Office Action", U.S. Appl. No. 13/118,339, dated Feb. 11, 2013, 15 pages.
"Non-Final Office Action", U.S. Appl. No. 13/118,347, dated Feb. 12, 2013, 14 pages.
"Non-Final Office Action", U.S. Appl. No. 13/196,272, dated Feb. 6, 2013, 10 pages.
"Non-Final Office Action", U.S. Appl. No. 13/224,258, dated Jan. 8, 2013, 35 pages.
"Non-Final Office Action", U.S. Appl. No. 13/229,693, dated Mar. 12, 2013, 21 pages.
"Non-Final Office Action", U.S. Appl. No. 13/270,111, dated Oct. 21, 2013, 9 pages.
"Non-Final Office Action", U.S. Appl. No. 13/418,884, dated Sep. 30, 2013, 7 pages.
"Non-Final Office Action", U.S. Appl. No. 13/418,884, dated Mar. 10, 2014, 8 pages.
"Non-Final Office Action", U.S. Appl. No. 13/418,884, dated Jun. 16, 2014, 8 pages.
"Non-Final Office Action", U.S. Appl. No. 13/461,656, dated Aug. 8, 2014, 27 pages.
"Non-Final Office Action", U.S. Appl. No. 13/492,495, dated Dec. 19, 2012, 6 pages.
"Non-Final Office Action", U.S. Appl. No. 13/492,495, dated Sep. 17, 2012, 8 pages.
"Non-Final Office Action", U.S. Appl. No. 13/655,386, dated Dec. 26, 2012, 23 pages.
"Non-Final Office Action", U.S. Appl. No. 13/656,354, dated Feb. 6, 2013, 10 pages.
"Non-Final Office Action", U.S. Appl. No. 13/656,574, dated Jan. 31, 2013, 21 pages.
"Non-Final Office Action", U.S. Appl. No. 13/657,621, dated Feb. 7, 2013, 19 pages.
"Non-Final Office Action", U.S. Appl. No. 13/657,646, dated Jan. 3, 2013, 13 pages.
"Non-Final Office Action", U.S. Appl. No. 13/657,789, dated Jan. 9, 2013, 38 pages.
"Non-Final Office Action", U.S. Appl. No. 13/712,777, dated Mar. 20, 2014, 7 pages.
"Notice of Acceptance", AU Application No. 2010260165, dated Jun. 23, 2014, 3 Pages.
"Notice of Allowance", U.S. Appl. No. 11/215,052, dated Mar. 14, 2012, 5 pages.
"Notice of Allowance", U.S. Appl. No. 11/305,789, dated Nov. 23, 2009, 8 pages.
"Notice of Allowance", U.S. Appl. No. 12/414,382, dated Apr. 4, 2012, 4 pages.
"Notice of Allowance", U.S. Appl. No. 12/414,434, dated Aug. 17, 2012, 4 pages.
"Notice of Allowance", U.S. Appl. No. 12/414,455, dated Jan. 4, 2012, 4 pages.
"Notice of Allowance", U.S. Appl. No. 12/414,458, dated Oct. 31, 2011, 2 pages.
"Notice of Allowance", U.S. Appl. No. 12/414,458, dated Nov. 29, 2011, 2 pages.
"Notice of Allowance", U.S. Appl. No. 12/414,458, dated Aug. 10, 2011, 6 pages.
"Notice of Allowance", U.S. Appl. No. 12/433,605, dated Apr. 25, 2014, 4 pages.
"Notice of Allowance", U.S. Appl. No. 12/433,667, dated Jun. 25, 2013, 14 pages.
"Notice of Allowance", U.S. Appl. No. 12/469,419, dated Nov. 27, 2012, 13 pages.
"Notice of Allowance", U.S. Appl. No. 12/470,558, dated Apr. 2, 2012, 7 pages.
"Notice of Allowance", U.S. Appl. No. 12/470,558, dated Aug. 23, 2012, 2 pages.
"Notice of Allowance", U.S. Appl. No. 12/484,799, dated Oct. 22, 2012, 10 pages.
"Notice of Allowance", U.S. Appl. No. 12/484,845, dated Mar. 16, 2012, 5 pages.
"Notice of Allowance", U.S. Appl. No. 12/977,584, dated Jun. 19, 2013, 5 pages.
"Notice of Allowance", U.S. Appl. No. 12/978,184, dated Aug. 2, 2013, 5 pages.
"Notice of Allowance", U.S. Appl. No. 13/270,111, dated Mar. 7, 2014, 6 pages.
"Notice of Allowance", U.S. Appl. No. 13/418,884, dated Aug. 5, 2014, 4 pages.
"Notice of Allowance", U.S. Appl. No. 13/492,495, dated Apr. 26, 2013, 5 pages.
"Notice of Allowance", U.S. Appl. No. 13/655,390, dated May 24, 2013, 5 pages.
"Notice of Allowance", U.S. Appl. No. 13/712,777, dated Jul. 2, 2014, 4 pages.
"Notice of Allowance", U.S. Appl. No. 14/330,221, dated Oct. 16, 2014, 7 pages.
"Notifications", retrieved from <http://msdn.microsoft.com/en-us/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Jun. 28, 2011, Dec. 15, 2008, 3 pages.
"Snap", Windows 7 Features—retrieved from <http://windows.microsoft.com/en-US/windows7/products/features/snap> on Sep. 23, 2011, 2 pages.
"Supplemental Notice of Allowance", U.S. Appl. No. 12/433,667, dated Oct. 10, 2013, 2 pages.
"Supplemental Notice of Allowance", U.S. Appl. No. 12/433,667, dated Aug. 1, 2013, 2 pages.
"Supplemental Notice of Allowance", U.S. Appl. No. 13/655,390, dated Jul. 25, 2013, 2 pages.
"Symbian Applications", Retrieved from: <http://symbianfullversion.blogspot.com/2008_12_01_archive.html> on May 5, 2009., Jan. 2009, 51 Pages.
"The Map Screen", retrieved from <http://www.symbianos.org/whereamiusersguide> on Jun. 17, 2011, 3 pages.

(56) References Cited

OTHER PUBLICATIONS

"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"Windows 8 Is Gorgeous, But Is It More Than Just a Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOffice tutorial!—retrieved from <http://www.msoffice-tutorial.com/working-with-multiple-windows.php> on Sep. 23, 2011, 3 pages.
"YUI 3: ScrollView [beta]", Retrieved from: <http://developer.yahoo.com/yui/3/scrollview/> on Sep. 28, 2010, 5 pages.
Bates,"A Framework to Support Large-Scale Active Applications", University of Cambridge Computer Laboratory—Available at <http://citeseerx.ist.psu.edu/viewdoc/download?doi=10.1.1.48.1690&rep=rep1&type=pdf>, 1996, 8 pages.
Beiber,"Screen Coverage: A Pen-Interaction Problem for PDA's and Touch Screen Computers", In Proceedings of ICWMC 2007, Mar. 2007, 6 pages.
Bjork,"Redefining the Focus and Context of Focus+Context Visualizations", In Proceedings of INFOVIS 2000—Available at <http://www.johan.redstrom.se/papers/redefining.pdf>, Oct. 2000, 9 pages.
Bowes,"Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.
Bruzzese,"Using Windows 7, Managing and Monitoring Windows 7—Chapter 11", Que Publishing, May 5, 2010, 33 pages.
Buring,"User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1&type=pdf >, Sep. 2006, pp. 829-836.
Carrera,"Conserving Disk Energy in Network Servers", available at <http://citeseerx.ist.psu.edu/viewdoc/download?doi=10.1.1.6.8301&rep=rep1&type=ps>, Nov. 2002, 15 pages.
Cawley,"How to Customize Your Windows Phone 7", Retrieved from: <http://www.brighthub.com/mobile/windows-mobile-platform/articles/95213.aspx> on May 10, 2011, Nov. 12, 2010, 3 pages.
Cawley,"Windows Phone 7 Customization Tips and Tricks", retrieved from <http://www.brighthub.com/mobile/windows-mobile-platform/articles/95213.aspx> on Jun. 20, 2011, May 16, 2011, 2 pages.
Cohen,"Wang Tiles for Image and Texture Generation", In Proceedings of SIGGRAPH 2003—Available <http://research.microsoft.com/en-us/um/people/cohen/WangFinal.pdf>, 2003, 8 pages.
Crouch,"Smartphone Wars: Micron's Slide-to-Unlock Patent", Jan. 30, 2013, 2 pages.
Damien,"7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.
Davis,"A WPF Custom Control for Zooming and Panning", Retrieved from: <http://www.codeproject.com/KB/WPF/zoomandpancontrol.aspx> on Sep. 28, 2010, Jun. 29, 2010, 21 pages.
Delimarsky,"Sending Tile Push Notifications on Windows Phone 7", retrieved from <http://mobile.dzone.com/articles/sending-tile-push> on May 10, 2011, Aug. 25, 2010, 2 pages.
Denoue,"WebNC: Efficient Sharing of Web Applications", In Proceedings of WWW 2009—Available at <http://www.fxpal.com/publications/FXPAL-PR-09-495.pdf>, 2009, 2 pages.
Dolcourt,"Webware", Retrieved from: <http://news.cnet.com/webware/?categoryId=2010> on May 5, 2009., May 5, 2009, 13 Pages.
Dunsmuir,"Selective Semantic Zoom of a Document Collection", Available at <http://www.cs.ubc.ca/~tmm/courses/533/projects/dustin/proposal.pdf>, Oct. 30, 2009, pp. 1-9.
Faaborg,"The Design Review Episode 2: Chromeless Browsing", Available at: http://vimeo.com/2836740, Jan. 15, 2009, 3 pages.
Fisher,"Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.
Gade,"Samsung Allas u740", Retrieved from: <http://www.mobiletechreview.com/phones/Samsung-U740.htm> on Nov. 20, 2008, Mar. 14, 2007, 6 pages.
Gao,"A General Logging Service for Symbian based Mobile Phones", Retrieved from: <http://www.nada.kth.se/utbildning/grukth/exjobb/rapportlistor/2007/rapporter07/gao_rui_0 7132.pdf.> on Jul. 17, 2008, Feb. 2007, pp. 1-42.
Gralla,"Windows XP Hacks, Chapter 13—Hardware Hacks", O'Reilly Publishing, Feb. 23, 2005, 25 pages.
Ha,"SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.
Harrison,"Symbian OS C++ for Mobile Phones Volume 3", Retrieved from: <http://www.amazon.co.uk/Symbian-OS-Mobile-Phones-Press/dp/productdescription/0470066415> on Oct. 23, 2008, Symbian Press, Jun. 16, 2003, 4 pages.
Hickey,"Google Android has Landed; T-Mobile, HTC Unveil G1", Retrieved from: <http://www.crn.com/retail/210603348> on Nov. 26, 2008., Sep. 23, 2008, 4 pages.
Horowitz,"Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.
Janecek,"An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>, Feb. 15, 2005, pp. 1-15.
Kcholi,"Windows CE .NET Interprocess Communication", Retrieved from http://msdn.microsoft.com/en-us/library/ms836784.aspx on Jul. 17, 2008., Jan. 2004, 15 Pages.
Kurdi,"Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.
Kurdi,"WinSplit Revolution", Retrieved from <http://www.freewaregenius.com/winsplit-revolution/> on Jun. 30, 2013, Aug. 22, 2007, 4 Pages.
La,"Parallax Gallery", Available at <http://webdesignerwall.comtutorials/parallax-gallery/comment-page-1>, Apr. 25, 2008, 16 pages.
Livingston,"Windows 95 Secrets", 1995, I DG Books Worldwide, 3rd Edition, 1995, pp. 121-127.

(56) References Cited

OTHER PUBLICATIONS

Long,"Gmail Manager 0.6", Retrieved from: <https://addons.mozilla.org/en-US/firefox/addon/1320/> on Sep. 29, 2010, Jan. 27, 2010, 4 pages.

Mann,"Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.

Mantia,"Multitasking: What Does It Mean?", retrieved from <http://mantia.me/blog/multitasking/> Sep. 23, 2011, 3 pages.

Mao,"Comments of Verizon Wireless Messaging Services, LLC", Retrieved from: http://www.ntia.doc.gov/osmhome/warnings/comments/verizon.htm on May 6, 2009., Aug. 18, 2000, 5 Pages.

Marie,"MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.

Mei,"Probabilistic Multimodality Fusion for Event Based Home Photo Clustering", Retrieved from: <http://ieeexplore.ieee.org//istamp/stamp.jsp?tp=&arnumber=04036960.>, Dec. 26, 2006, pp. 1757-1760.

Nordgren,"Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.

Oliver,"Potential iPhone Usability and Interface Improvements", Retrieved from: <http://www.appleinsider.com/articles/08/09/18/potential_iphone_usability_and_interface_improvements.html> on Nov. 12, 2008, AppleInsider, Sep. 18, 2008, 4 pages.

Oryl,"Review: Asus P527 Smartphone for North America", Retrieved from: <http://www.mobileburn.com/review.jsp?Id=4257> on Dec. 17, 2008., Mar. 5, 2008, 1 Page.

Padilla,"Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.

Paul,"Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.

Perry,"Teach Yourself Windows 95 in 24 Hours", 1997, Sams Publishing, 2nd Edition, 1997, pp. 193-198.

Raghaven,"Model Based Estimation and Verification of Mobile Device Performance", Available at http://alumni.cs.ucsb.edu/~raimisl/emsoft04_12.pdf., Sep. 27-29, 2004, 10 Pages.

Ray,"Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.

Reed,"Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.

Remond,"Mobile Marketing Solutions", Retrieved from: <http://www.mobilemarketingmagazine.co.uk/mobile_social_networking/> on May 5, 2009., Apr. 28, 2009, 16 Pages.

Rice,"A System for Searching Sound Palettes", Proceedings of the Eleventh Biennial Symposium on Arts and Technology,, Available at <http://www.comparisonics.com/FindSoundsPalettePaper.pdf>, Feb. 2008, 6 pages.

Ritchie,"iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.

Ritscher, "Using Surface APIs in your WPF application—Part 1", Retrieved from: <http://blog.wpfwonderland.com/2009/06/30/using-surface-apis-in-your-wpf-application/> on Sep. 28, 2010, Jun. 30, 2009, 7 pages.

Roberts,"Touching and Gesturing on the iPhone", Available at <http://www.sitepen.com/blog/2008/07/10/touching-and-gesturing-on-the-iphone/comments-pare-1>, Jul. 10, 2008, 16 pages.

Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep&type=pdf>, 2004, 18 pages.

Singh,"CINEMA: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.

Smith,"GroupBar: The TaskBar Evolved", Proceedings of OZCHI 2003—Available at <http://research.microsoft.com/pubs/64316/ozchi2003-groupbar.pdf>, Nov. 2003, pp. 1-10.

Steinicke,"Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>, Jun. 15, 2008, 4 Pages.

Suror,"PocketShield—New Screenlock App for the HTC Diamond and Pro", Retrieved from: <http://wmpoweruser.com/?tag=htc-touch-diamond> on Jun. 28, 2011, Oct. 23, 2008, 2 pages.

Terpstra,"Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.

Vallerio,"Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.

Vermeulen,"BlackBerry PlayBook Hands-on", retrieved from <http://mybroadband.co.za/news/gadgets/20104-BlackBerry-PlayBook-hands-.html> on May 11, 2011, May 8, 2011, 4 pages.

Viticci,"Growl 1.3 to Be Released on Mac App Store, Introduce Lion Support and Drop GrowlMail Support", Retrieved from: <http://www.macstories.net/stories/growl-1-3-to-be-released-on-mac-app-store-introduce-lion-support-and-drop-growlmail-support/> on Jul. 22, 2011, Jul. 6, 2011, 6 pages.

Vornberger,"Bluetile", Retrieved from: <http://www.bluetile.org> on Sep. 29, 2010, 5 pages.

Wilson,"How the iPhone Works", Retrieved from: <http://electronics.howstuffworks.com/iphone2.htm> on Apr. 24, 2009, Jan. 2007, 9 pages.

Wilson,"Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%2020060%20taffi.pdf>, Oct. 2006, 4 pages.

Wobbrock,"User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.

Wu,"Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.

Wyatt,"/Flash/the art of parallax scrolling", .net Magazine, Aug. 1, 2007, pp. 74-76.

Yang,"Semantic Photo Album Based on MPEG-4 Compatible Application Format", Retrieved from: <http://ieeexplore.ieee.org/stamp/stamp.jsp?arnumber=04146254.>, 2007, 2 Pages.

"Use Progressive Escalation Where Applicable", Retrieved From<<https://msdn.microsoft.com/pt-br/library/dn742472(v=vs.85).aspx>>, Oct. 9, 2005, 16 Pages.

(56) References Cited

OTHER PUBLICATIONS

Office Action received in European Patent Application No. 10762120.3, dated Nov. 30, 2017, 3 pages.

* cited by examiner

CHROMELESS USER INTERFACE

RELATED APPLICATIONS

This Application claims priority under 35 U.S.C. Section 120 as a continuation of U.S. application Ser. No. 13/418,884, filed Mar. 13, 2012, and titled "Chromeless User Interface", which is a continuation of Ser. No. 12/414,455, filed Mar. 30, 2009, and titled "Chromeless User Interface," the disclosures of each of which are hereby incorporated by reference in their entirety.

BACKGROUND

Mobile devices such as mobile phones including smart phones, wireless phones, and so forth, have become an integral part of everyday life. Communication techniques that may be employed using a mobile device have also increased. For example, users were traditionally limited to telephone calls between mobile communications devices and landline telephones. Advances have been made to provide a variety of other communication techniques, e.g., text messaging, email, social networking, and so forth. However, inclusion of these additional communication techniques on mobile devices having traditional form factors may cause these devices to become unwieldy and less suitable for mobile applications. For example, traditional input devices that were employed by these communication techniques may be less suitable when applied by traditional mobile devices.

SUMMARY

Techniques are described to implement a user interface for a display of a mobile device that is configured to generate a chromeless user experience for the mobile device. In implementations, the user interface may include a menu system configured to be displayed when menu-based user input to the mobile device is available. In additional implementations, the user interface may include a system tray configured to be displayed in response to a notification containing at least one of communication related information or device status information affecting operability of the mobile device. In further implementations, the user interface may include a task switcher operable to display indicia corresponding to one or more non-active tasks running on the mobile device in an overlay superimposed over a user experience of an active task, the task switcher being configured to switch to one of the one or more non-active tasks in response selection of the indicia.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
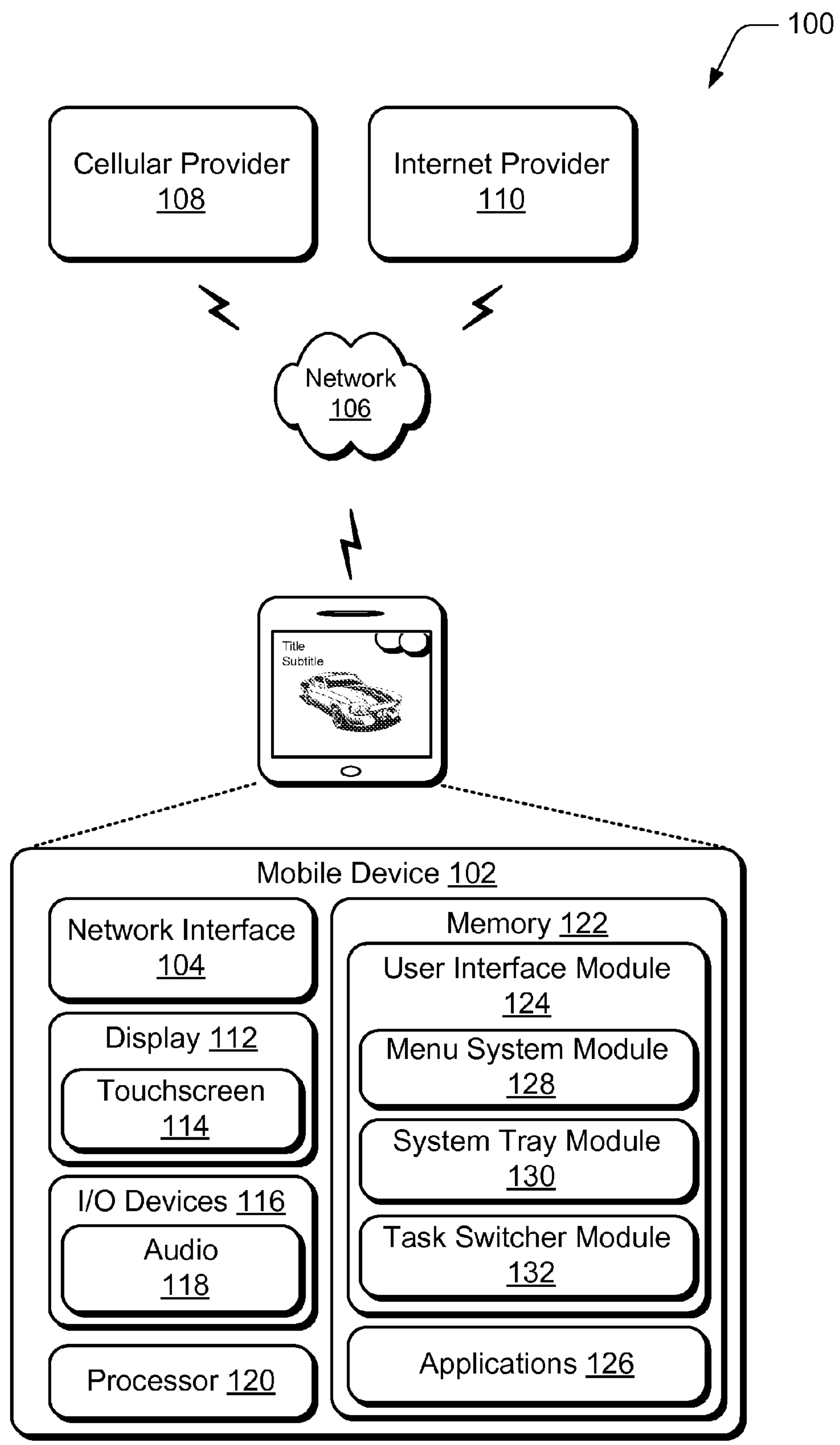
FIG. 1 is an illustration of an example mobile device environment that is operable to generate a user interface.

The functionality provided by mobile devices such mobile phones including smart phones, cell phones, and so forth is ever increasing. Traditionally, mobile devices employed user interfaces that relied heavily on graphical elements such as menu bars, scroll bars, windows, text boxes, and so on to generate the user experience for the mobile device. These graphical elements are referred to as the "chrome" of the user interface.

As the functionality of mobile devices has increased, more complex user interfaces are employed to organize the increasing amount of information presented to the user. These more-complex user interfaces tend to make extensive use of "chrome" elements. However, mobile devices generally have small form factors and typically employ displays that furnish limited space for display of the user interface. Consequently, in complex user interfaces chrome may occupy a substantial amount of the mobile device's display area, making the display appear cluttered and lessening the user experience.

Techniques are described to implement a user interface that is configured to generate a chromeless user experience for a mobile device. In an implementation, an application may be executed that is configured to furnish a user experience for a display of a mobile device such as a mobile phone. The user interface is implemented to cause an application programming interface (API) to be generated to expose functionality to the application to configure the application for chromeless display of the user experience.

In implementations, the user interface may include a variety of features. For instance, in one implementation, the user interface employs a menu system that provides extended functionality to applications running on the mobile device without the use of traditional chrome elements. The menu system employs menu elements that are displayed when menu-base user input is available. The user interface may also include a system tray configured to be displayed in response to a notification containing at least one of communication related information or device status information affecting operability of the mobile device. In embodiments, common device status notifications such as battery status or signal strength may be removed from the user interface until they become important, so that chrome elements are not used to display these notifications.

The user interface may also employ a task switcher operable to display indicia (e.g., thumbnails or icons) corresponding to one or more non-active tasks running on the mobile device in an overlay superimposed over a user experience of an active task. The task switcher is configured to switch to one of the non-active tasks in response selection of the indicia. Still further, the user interface may employ a dashboard configured to access to one or more settings of the mobile device so that common settings such may be readily adjusted. In embodiments, the system tray may comprise one or more launch points for launching tasks. For example, in one embodiment, the system tray may include a task switcher launch point and a dashboard launch point configured to launch the task switcher and dashboard, respectively.

In the following discussion, an example environment is first described that is operable to generate a user interface. Examples of user interfaces are then described that may be employed in the illustrated environment, as well as in other environments without departing from the spirit and scope thereof.

Example Environment

FIG. 1 illustrates an exemplary mobile device environment 100 that is operable to perform the techniques discussed herein. The environment 100 includes a mobile device 102 operable to implement a user interface that generates a chromeless user experience. The mobile device 102 may be configured in a variety of ways. For example, the mobile device 102 may be configured as a mobile communication device such as a smart phone, a cell phone, a personal digital assistant, and so on. The mobile device 102 includes a network interface 104 that may enable the device to communicate with one or more networks, such as network 106 to access service providers such as a cellular provider 108 and an internet provider 110 that provide cellular phone, network connectivity and/or data retrieval functionality to various aspects of the environment.

The network 106 may assume a wide variety of configurations. For example, the network 106 may include a cellular telephone network, the Internet, a wide area network (WAN), a local area network (LAN), a wireless network (e.g., a WIFI (IEEE 802.11) network), a public telephone network, an extranet, an intranet, and so on. Further, although a single network 106 is shown, the network 106 may be configured to include multiple networks. For instance, the mobile device 102, configured as a smart phone, may access a webpage within a corporate intranet via a cellular telephone network. A variety of other instances are also contemplated.

The mobile device 102 also includes a display 112 to display information to the user of the mobile device 102. In embodiments, the display 112 may comprise an LCD (Liquid Crystal Diode) display, a TFT (Thin Film Transistor) LCD display, an LEP (Light Emitting Polymer or PLED (Polymer Light Emitting Diode) display, and so forth, configured to display text and/or graphical information such as a graphical user interface. The display 112 may be backlit via a backlight such that it may be viewed in the dark or other low-light environments. In specific implementations, the display 112 may be provided with a touch screen 114 for entry of data and commands. The mobile device 102 may further include one or more input/output (I/O) devices 116 (e.g., a keypad, buttons, a wireless input device, data input, and so on). The input/output devices 116 may include one or more audio I/O devices 118, such as a microphone, speakers, and so on.

The various devices and modules of the mobile device 102 are communicatively coupled to a processor 120 and memory 122. The processor 120 provides processing functionality for the mobile device 102 and may include any number of processors, micro-controllers, or other processing systems and resident or external memory for storing data and other information accessed or generated by the mobile device 102. The processor 120 may execute one or more software programs which implement the techniques and modules described herein. The processor 120 is not limited by the materials from which it is formed or the processing mechanisms employed therein, and as such, may be implemented via semiconductor(s) and/or transistors (e.g., electronic integrated circuits (ICs)), and so forth.

The memory 122 is an example of computer-readable media that provides storage functionality to store various data associated with the operation of the mobile device 102, such as the software program and code segments mentioned above, or other data to instruct the processor 120 and other elements of the mobile device 102 to perform the techniques described herein. Although a single memory 122 is shown, a wide variety of types and combinations of memory may be employed. The memory 122 may be integral with the processor 120, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the mobile device 102, the memory 122 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

In implementations, the mobile device 102 includes a user interface module 124, which is storable in memory 122 and executable by the processor 120. The user interface module 124 is representative of functionality to generate a user experience that is operable to control the display of information and data to the user of the mobile device 102 via the display 112. The user interface module 124 may also provide functionality to allow the user to interact with one or more applications 126 of the mobile device 102 by providing inputs via the touch screen 114 and/or the I/O devices 116. Applications 126 may comprise software, which is storable in memory 122 and executable by the processor 120 to perform a specific operation or group of operations and/or to furnish a user experience for the mobile device 102. Example applications 126 may include cellular telephone applications, instant messaging applications, browsers, photograph sharing applications, calendar applications, address book applications, and so forth.

In an implementation, an application 126 stored in memory 122 may be executed by the processor 120. The application 126 is configured to furnish a user experience for the mobile device 102. For example, the application 126 may furnish a user experience for display by the display 112 of the mobile device 102, e.g., by providing content to be displayed by the display. The user interface module 126 may cause an application programming interface (API) to be generated to expose functionality to the application 126 to configure the application 126 for chromeless display of the user experience by the display 112. In embodiments, the user interface module 124 may also provide functionality to allow the user to interact with user experience furnished by the application 126 by providing inputs via the touch screen 114 and/or the I/O devices 116. An example user interface 500 that may be implemented by the user interface module 124 to generate a chromeless user experience is described in relation to FIG. 5.

Figure 6A:
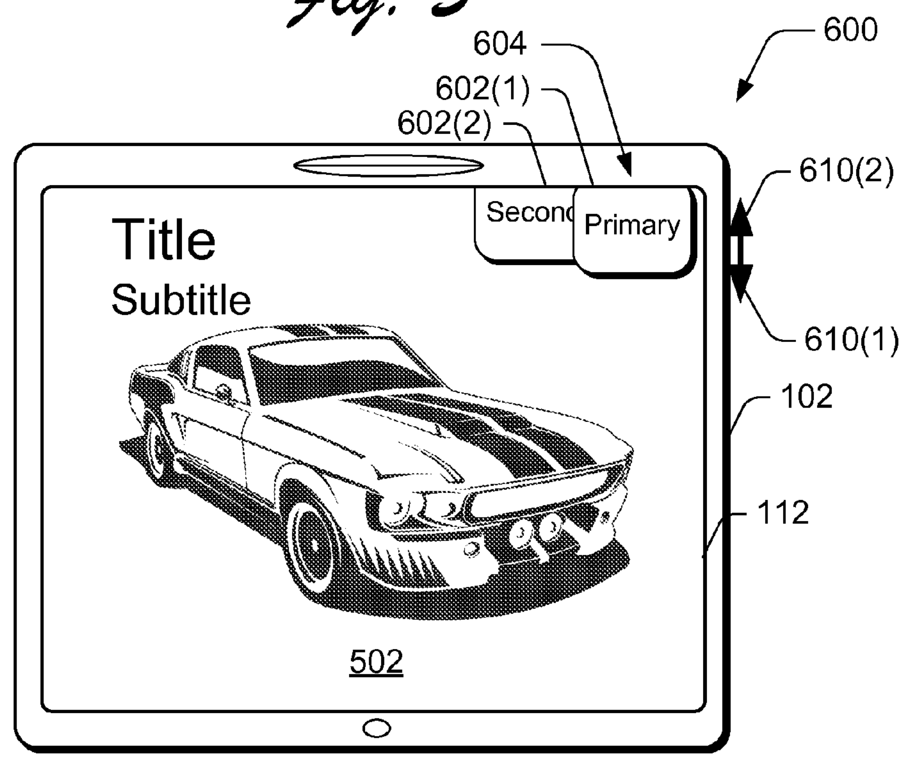
FIG. 6A is an illustration depicting an example top level menu of the menu system of the user interface of FIG. 5.
Figure 6B:
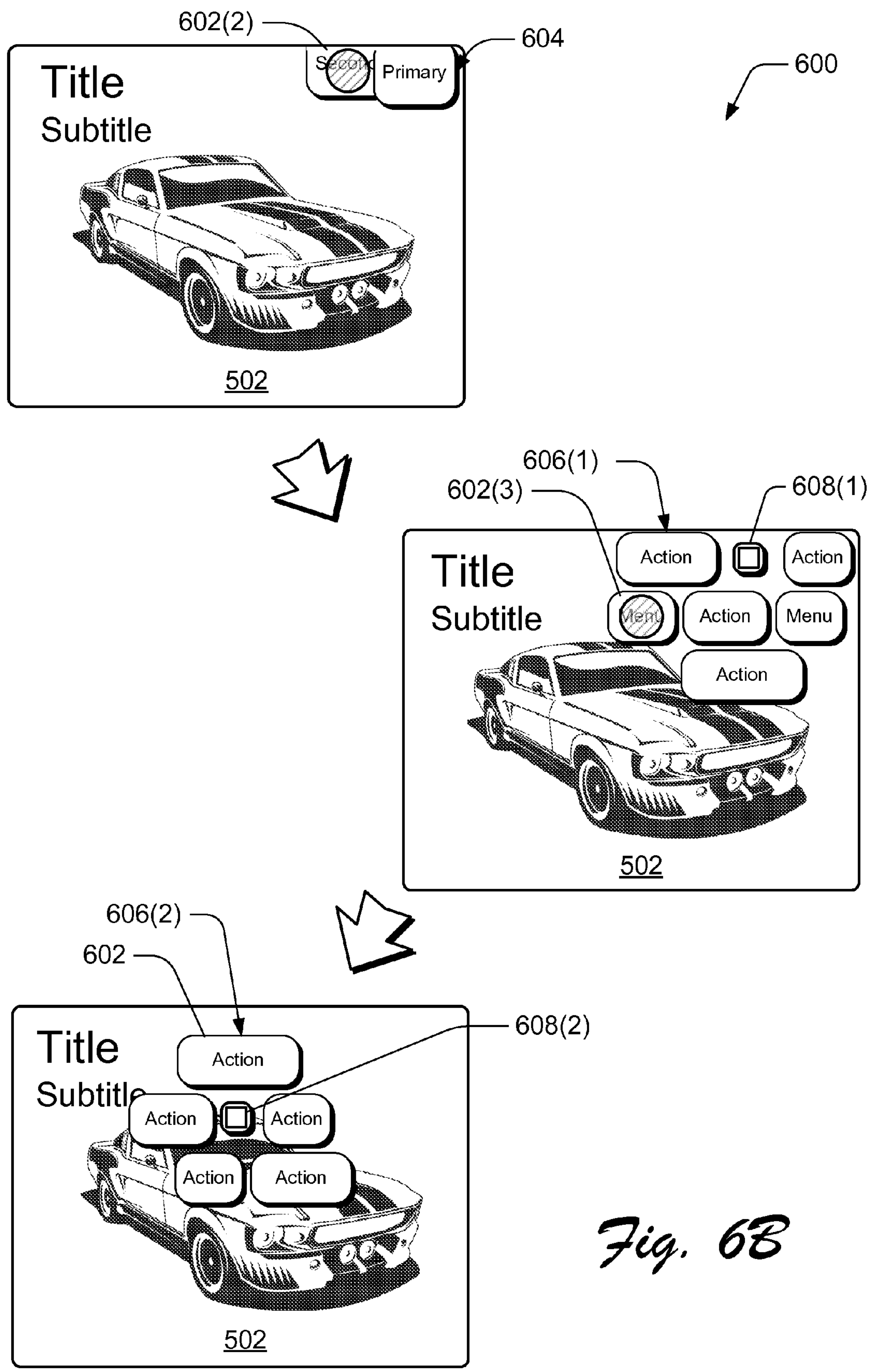
FIG. 6B is an illustration depicting example submenus that may be accessed via a top level menu of the menu system of FIG. 6A.

In implementations, the user interface module 124 may include a menu system module 128, a system tray module 130, and a task switcher module 132. The menu system module 128 is representative of functionality to generate a menu system that provides functionality to user interface module 124 and/or applications 126 executing on the mobile device 102. In embodiments, the menu system does not permanently display chrome elements such as status bars, scroll bars, and so forth. Instead, the menu system may be displayed in response to a determination that a menu-based input is available. Menu-based input may be made to the user interface module 124 or an application 126. In embodiments, the menu system includes menu items that may be selected by a user of the mobile device 102 via the touch screen 114 or an I/O device 116 such as a keypad, a button, and so on. When the menu-based input is not available, the menu system is not displayed. An example procedure 200 that may be employed by the menu system module 128 to generate a menu system is described below in relation to FIG. 2. An example menu system 600 that may be generated by the menu system module 128 is described below in relation to FIGS. 6A and 6B. Example menu items 700 that may be utilized by the menu system 600 of FIGS. 6A and 6B are described in relation to FIG. 7.

The system tray module 130 is representative of functionality to generate a system tray that is configured to provide notifications including communication related notifications and device status notifications to a user of the mobile device 102. In embodiments, the system tray module 130 may cause common device system status notifications such as battery status, signal strength, and so forth, to be removed from the user interface until the status information meets predefined criteria resulting in a determination that the status information is to be furnished to the user. For example, in one embodiment, the system tray module 130 may cause a status notification indicating that low battery life is to be displayed when the battery life of the mobile device 102 falls below a predetermined level. In this manner, chrome elements traditionally employed by user interfaces to provide status information may be removed from the display 112 to reduce display clutter.

The system tray module 130 may also provide functionality to generate launch points for launching various tasks such as elements of the user interface, applications 126, and so forth. For instance, in one embodiment, the system tray module 130 may cause launch points to be generated within the user interface to launch a dashboard to display settings used for operation of the mobile device 102, operational status notification (e.g., low battery life, low signal strength, etc.), and so forth. An example system tray 800 that may be generated by the system tray module 130 is described in relation to FIGS. 8A, 8B and 8C. An example dashboard that may be launched from the system tray 800 is described in relation to FIG. 9.

The task switcher module 132 is representative of functionality to generate a task switcher. In embodiments, the task switcher may be accessed via a single user interaction to navigate among two or more tasks (e.g., an application 126) supported by the mobile device 102. For instance, the task switcher module 132 may be configured to cause an overlay to be displayed over a user experience of an active task, e.g., an application 126 being executed by the processor 120 of the mobile device 102 causing information to be displayed by the display 112. The overlay may include indicia (e.g., thumbnails or icons) corresponding to one or more non-active tasks running on the mobile device 102 so that a user may switch to one of the one or more non-active tasks in response selection of one of the indicia. An example task switcher 1000 is described in relation to FIG. 10.

Generally, any of the functions described herein may be implemented using software, firmware, hardware (e.g., fixed logic circuitry), manual processing, or a combination of these implementations. The terms "module" and "functionality" as used herein generally represent software, firmware, hardware or a combination thereof. In the case of a software implementation, for instance, the module represents executable instructions that perform specified tasks when executed on a processor, such as the processor 120 of the mobile device 102 of FIG. 1. The program code may be stored in one or more tangible computer readable media, an example of which is the memory 122 of the mobile device 102 of FIG. 1. The features of the user interface generation techniques described below are platform-independent, meaning that the techniques may be implemented on a variety of commercial computing platforms having a variety of processors.

Example Procedures

The following discussion describes user interface configuration and generation techniques that may be implemented utilizing the previously described systems and devices. Aspects of each of the procedures may be implemented in hardware, firmware, software or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and/or other example embodiments.

Figure 2:
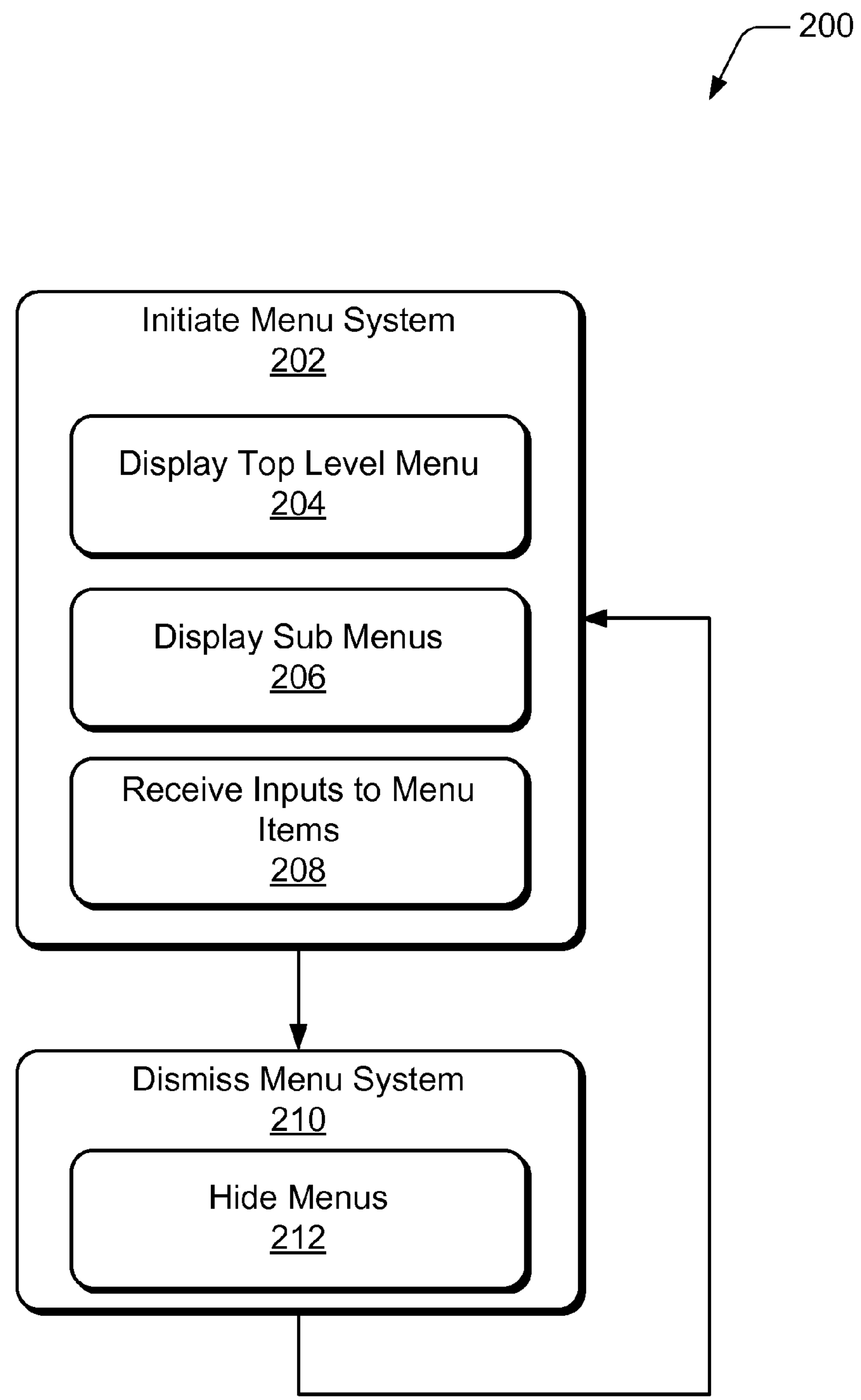
FIG. 2 is a flow diagram depicting a procedure in an example implementation in which a menu system may be generated by the user interface of the mobile device of FIG. 1.

FIG. 2 illustrates a procedure 200 in an example implementation in which a menu system may be generated by a user interface configured to provide a chromeless user experience. In implementations, the menu system may be initiated when menu-based user input is available (block 202). Menu-based user input is an input made by a user of the mobile device 102 utilizing the menu system. In embodiments, menu-based input is available when the user interface of the mobile device is configured to receive input from a user via the menu system. For instance, the menu system may be initiated by the user interface to accept input of information, to enter a setting for the mobile device, to select a user interface option, to receive an input to a generated prompt, and so forth.

The menu system may also be initiated when menu-based input is requested by an application of the mobile device to select an option of the application, to enter information in response to a prompt generated by the application, to set one or more settings of the application, and so forth. In implementations, when the menu system is initiated (block 202), a top level menu is first displayed (block 204). Multiple top level menus may be provided. Each top level menu may include one or more menu items that may be selected by the user of the mobile device.

One or more submenus may also be displayed (block 206). For instance, a submenu may be accessed through a top level menu. Submenus may also be nested beneath a top level menu so that they may be accessed through other submenus. Menu-based inputs may be received through the menu system via selection of one or more menu items of a top level menu or a submenu (block 208). When menu based input is no longer available, the menu system may be dismissed (block 210) so that menus of the menu system (e.g., the top level menu and/or any displayed sub-menus) are hidden (block 212) until menu based input is again available (block 202).

Figure 3:
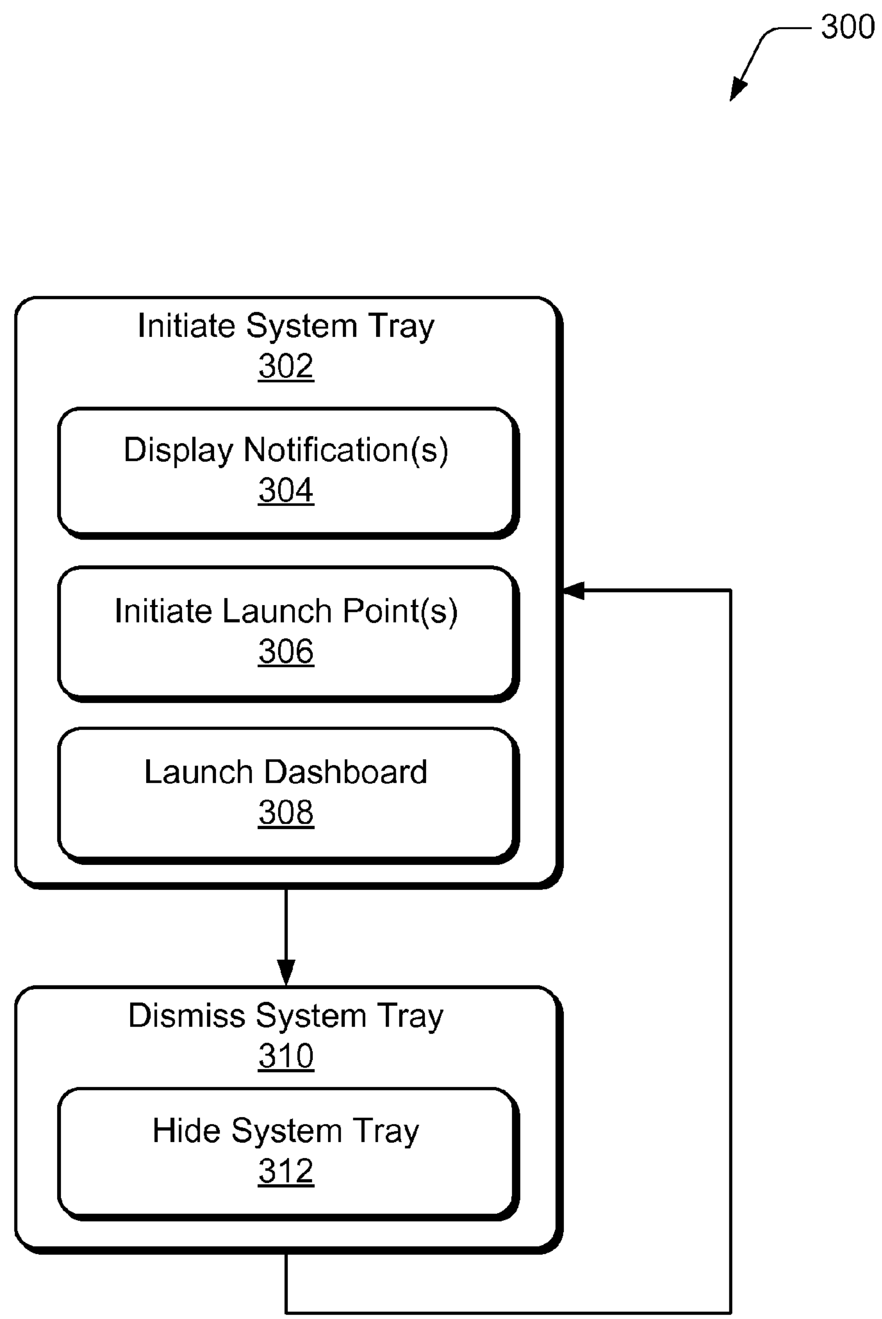
FIG. 3 is a flow diagram depicting a procedure in an example implementation in which a system tray may be generated by the user interface of the mobile device of FIG. 1.

FIG. 3 depicts a procedure 300 in an example implementation in which a system tray may be generated by a user interface configured to provide a chromeless user experience. In implementations, the system tray may be initiated (block 302) when a request to initiate the system tray is received. In embodiments, a request to initiate the system tray may be made by a variety of sources. For example, the system tray may be initiated to display notifications such as notification of communication related information or device status information (block 304) by the user interface. The system tray may also be initiated to furnish launch points for launching various tasks of the user interface (e.g., the task switcher), applications 126, and so forth (block 306).

In embodiments, the system tray may also be initiated to provide an interface to launch a dashboard to display settings used for operation of the mobile device, operational status notification (e.g., low battery life, low signal strength, etc.) and so forth (block 308). When the system tray is no longer used, the system tray may be dismissed (block 310) so that the system tray is hidden (block 312) until it is again initiated (block 302).

Figure 4:
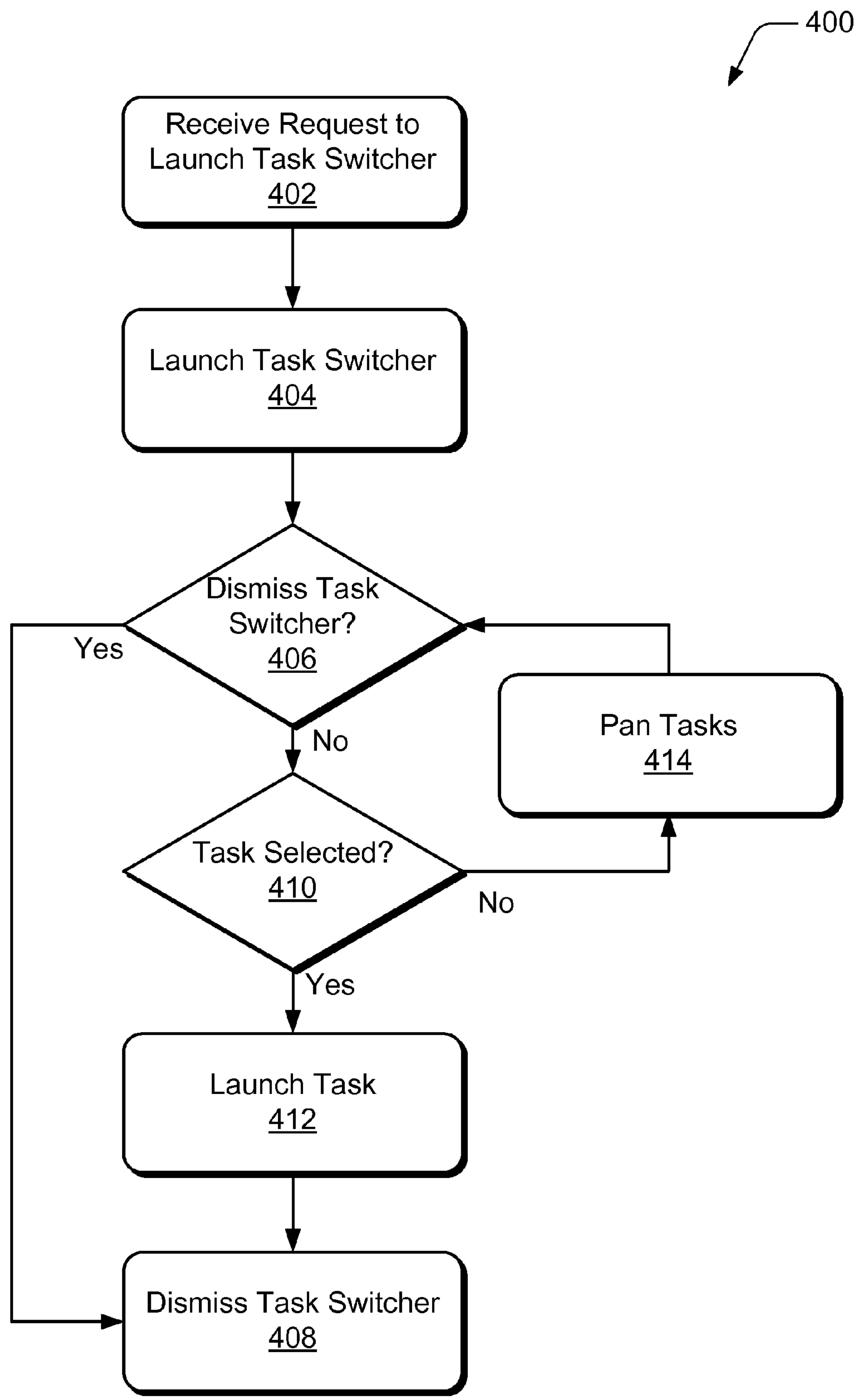
FIG. 4 is a flow diagram depicting a procedure in an example implementation in which a chromeless task switcher may be generated by the user interface of the mobile device of FIG. 1.

FIG. 4 depicts a procedure 400 in an example implementation in which a chromeless task switcher may be generated by a user interface configured to provide a chromeless user experience. As illustrated, a request may be received to launch the task switcher (block 402). In implementations, a request to launch the task switcher may be received through a user interaction with the mobile device implementing the user interface. For example, a request to launch the task switcher may comprise a user input made to a launch point of the system tray described above in relation to FIG. 2. However, the task switcher may be launched in other ways, such as by a voice command, selection of a button or key, and so forth.

The task switcher may then be launched (block 404). In embodiments, the task switcher may comprise an overlay that is displayed over the user experience of an active task (e.g., an application 126 being executed by the processor 120 of the mobile device 102 shown in FIG. 1). The overlay may include one or more indicia (e.g., thumbnails, icons, etc) indicating other currently running tasks (e.g., applications, notifications, etc.) that may be accessed. In embodiments, the task switcher may remain open until dismissed by the user of the mobile device. For example, a determination may be made whether the task switcher is to be dismissed (decision block 406). If a determination is made that the task switcher is to be dismissed ("yes" from decision block 406), the task switcher is dismissed (block 408) so that the overlay is no longer displayed. Otherwise, a determination is made that the task switcher is not to be dismissed ("no" from decision block 406).

A determination is then made whether a task has been selected (decision block 410). When a task is selected by the user ("yes" from decision block 410), the task may be launched (block 412) and the task switcher dismissed (block 408). In embodiments, when a task is not selected ("no" from decision block 410), the task switcher may allow the user to pan through the indicia indicating other currently running tasks (block 414) until a task may be selected and launched (block 412) or the task switcher dismissed (block 408) by the user without a selection being made. In some embodiments, the task switcher may also be timed out and dismissed (block 408) when no input is received within a predetermined duration of time.

Example User Interfaces

This section presents elements of a user interface that may be generated using the processes and techniques discussed herein to provide a chromeless user experience. Aspects of the user interface may be generated in hardware, firmware, software or a combination thereof. In portions of the following discussion, reference will be made to the environment 100 of FIG. 1, and the procedures 200, 300 and 400 of FIGS. 2, 3, and 4, respectively, and/or other example environments and procedures.

Figure 5:
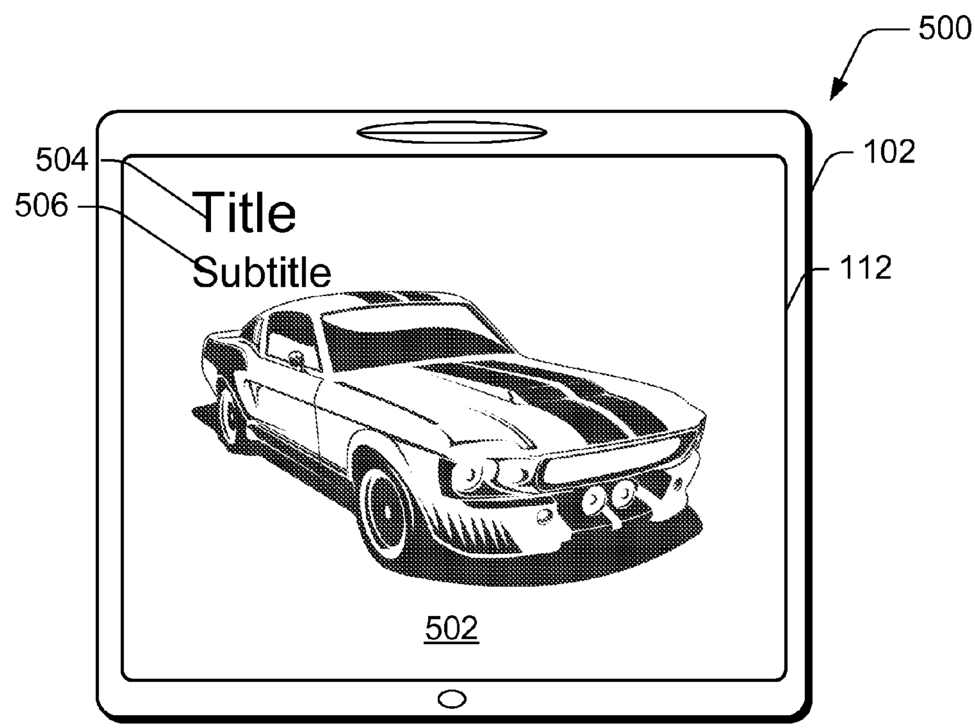
FIG. 5 is an illustration depicting a user interface that may be employed by a mobile device such as the mobile device of FIG. 1.
Figure 8A:
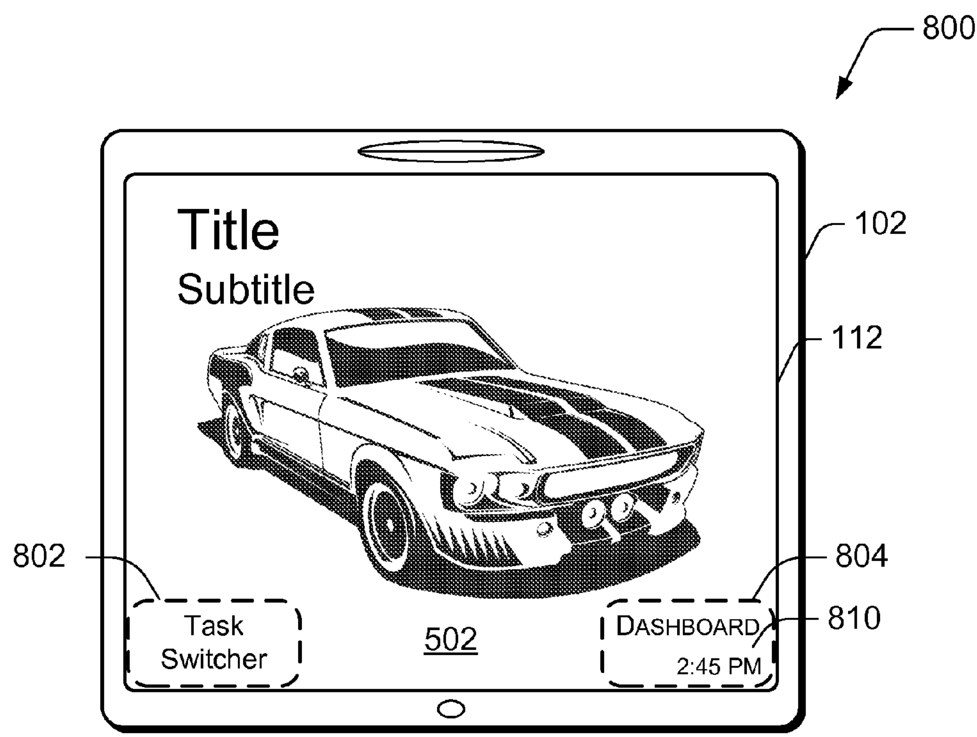
FIG. 8A is an illustration depicting an example system tray that may be employed by the user interface of FIG. 5.
Figure 8B:
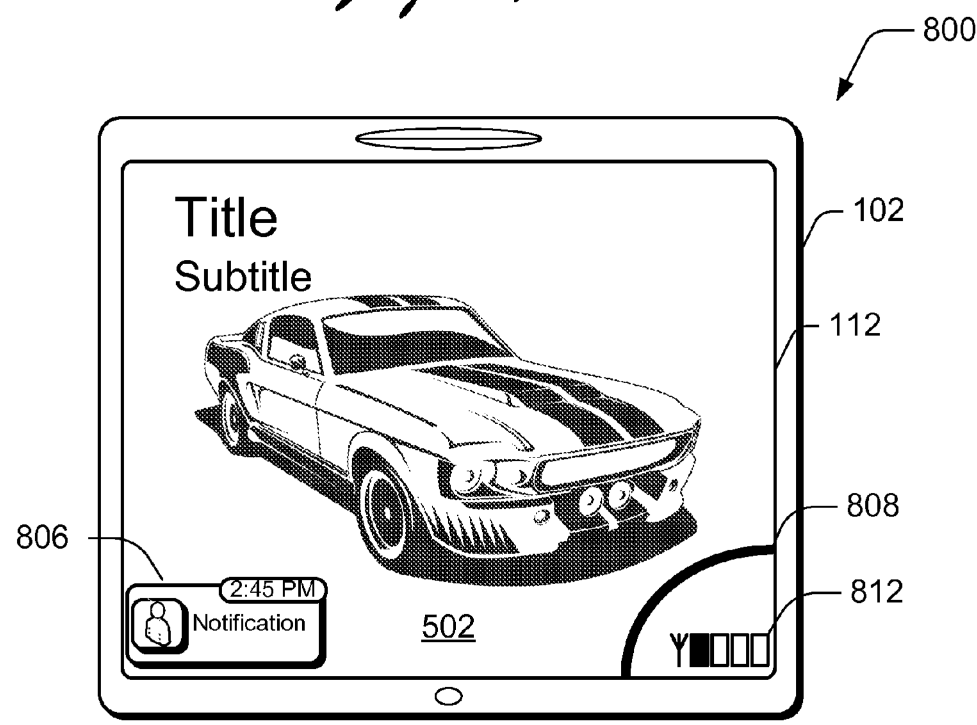
FIG. 8B is an illustration depicting the example system tray of FIG. 8A, further illustrating the display of communication related notifications and device status notifications by the status tray.
Figure 8C:
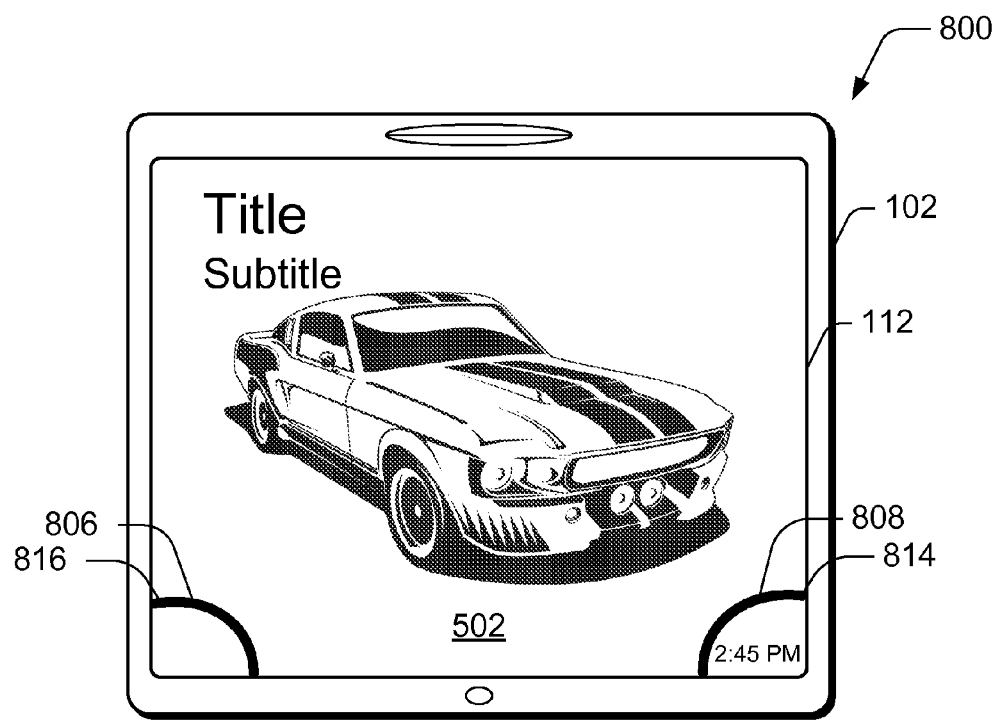
FIG. 8C is an illustration depicting the example system tray of FIGS. 8A and 8B, further illustrating communication related notifications and device status notifications that have been minimized within the system tray.

FIG. 5 illustrates a user interface 500 that may be employed by a mobile device such as the mobile device 102 of FIG. 1 to provide a chromeless user experience. During various operational modes, the user interface 500 is configured to provide a chromeless user experience 502 by displaying content from applications of the mobile device 102 without the use of traditional chrome elements such as such as menu bars, scroll bars, windows, text boxes, and so forth. Interaction with applications supported by the mobile device 102 is provided via a menu system 600 (FIGS. 6A and 6B) and a system tray 800 (FIGS. 8A, 8B, and 8C). A task switcher 1000 (FIG. 10) facilitates switching between applications running on the mobile device.

The user interface 500 may include text and/or graphics that provide context to the user experience 502. For instance, in the embodiment illustrated, the user interface includes a title 504 and subtitle 506 that are configured to identify the particular application accessed and/or to provide context to the content of the user experience 502 displayed by the application. Thus, a photo sharing application might include the title "Photos" and the subtitle "Summer Vacation—2008" to provide context photos displayed by the photo sharing application, while a cellular telephone application might include the title "Phone" and the subtitle "Call Log" to provide context to information displayed by the cellular telephone call log application. Other examples are contemplated.

FIGS. 6A and 6B illustrate an example menu system 600 that may be employed by the user interface 500 shown in FIG. 5. The menu system 600 makes use of menu items 602 that may be superimposed over the user experience 502 of the mobile device 102. In embodiments, the menu items 602 may be arranged into top level menus 604, an example of which is illustrated in FIG. 6A, and submenus 606, an example of which is illustrated in FIG. 6B.

FIG. 6A illustrates an example top level menu 604 of the menu system 600. The top level menu 604 as illustrated may include one or two menu items 602 depending on the number of initial options to be presented to the user. Where two menu items 602 are provided, the menu items 602 may be configured as a primary menu item 602(1) and a secondary menu item 602(2). In the embodiment illustrated, the primary and second menu items 602(1) & 602(2) are shown as overlapping one another with the primary menu item 602(1) displayed so that it appears to be in front of the secondary menu item 602(2). Additionally, the primary menu item 602(1) may extend farther into the user experience 502 (e.g., lower with respect to the top edge of the display 112 on which the user interface 500 (FIG. 5) is displayed) than the secondary menu item 602(2). The tops of both the primary and secondary menu items 602(1) & 602(2) may be clipped so that the menu items 602 appear to extend beyond the edge of the display 112.

Submenus 606 may be employed to display menu items 602 that are not displayed in a top level menu 604. FIG. 6B illustrates example submenus 606 that may be accessed via a top level menu 604 of the menu system 600. Unlike top level menus 604, submenus 606 may be configured to display more than two menu items 602 (although it is contemplated that a submenu 606 may configured to display no more than one or two menu items 602). In implementations, submenus 606 may be accessed via selection of a menu item 602 within a top level menu 604 that is configured to act as access point to the submenu 606. When a menu item 602 configured to access a submenu 606 is selected, the top level menu 604 containing the selected menu item 602 is hidden and the submenu 606 is displayed. The menu items 602 of the submenu 606 may be arranged in a pseudo-radial fashion around a central point ("satellite") 608 that is anchored at the initial location of the selected menu item 602 of the top level menu 604.

In implementations, multiple submenus 606 may be nested in levels beneath a top level menu 604. Thus, menu items 602 within some submenus 606(2) may be accessed by navigating (e.g., "drilling down") from a top level menu 604 through other, intermediate submenus 606(1). For example, as illustrated in FIG. 6B, the selection of the secondary menu item 602(2) of a top level menu 604 may cause a first submenu 606(1) to be displayed. The first submenu 606(1) may include a submenu item 602(3) that is configured to provide access to a second submenu 606(2) when selected.

The menu items 602 of each of the submenus 606(1) & 606(2) are clustered around satellites 608(1) & 608(2) anchored at the initial location of the menu item (e.g., secondary menu item 602(2) and submenu item 602(3), respectively) that was selected to cause display of the submenu 606(1) & 606(2). As nested submenus 606(1) & 606(2) are traversed, the satellites 608(1) & 608(2) within the submenus 606(1) & 606(2) may be selected to return to a higher level submenu 608(1) or a top level menu 604, respectively. For instance, in the embodiment shown in FIG. 6B, the satellite 608(2) of the second submenu 606(2) may be selected to hide the second submenu 606(2) and display the first submenu 606(1). Similarly, the satellite 608(1) of the first submenu 606(1) may be selected to cause the first submenu 606(1) to be hidden and the top level menu 604 to be displayed.

Navigation from a submenu such as the second submenu 606(2) directly to a top level menu 604, while bypassing intermediate level submenus such as submenu 606(1), may also be supported. For instance, selection of a point outside of a submenu 606 may cause the submenu 606 to be hidden and the top level menu 604 to be displayed. In other embodiments, a satellite 608 may be selected and held for a duration of time to return directly to a top level menu 604. Similarly, submenus 606 within the menu system 600 may include indicia such as a "back button" that is configured to provide navigation directly to a top level menu 604 from the submenu 606 when selected.

In implementations, the menu system 600 of FIGS. 6A and 6B may be animated. For instance, as shown in FIG. 6A, when a top level menu 604 is displayed, the menu items 602 of the top level menu 604 may appear to "slide down" from the top edge of the display 112 over the user experience 502 (as indicated by down arrow 610(1)). Similarly, when top level menus 604 are hidden, the menu items 602 of the top level menus 604 may appear to "slide up" to the top edge and off of the display 112 (as indicated by up arrow 610(2)). Display of submenus 606 may also be animated. For example, a submenu 606 may appear to "fly" from the satellite 608 in a pseudo-radial fashion when initiated. Similarly, selection of a satellite 608 may cause a displayed submenu 606 to "shrink" into the satellite 608, while transitioning to a higher level submenu 606 or a top level menu 604.

In FIGS. 6A and 6B, the menu items 602 illustrated are shown as generic blocks for purposes of explanation. However, it is contemplated example menu systems 600 may employ menu items 602 having a variety of shapes, colors, text styles, and so forth. For instance, in one embodiment, the menu items 602 employed by a menu system 600 may share a generally common shape such as an oval, a circle, a box, a speech bubble, and so forth. In other embodiments, menu items 602 employed by the menu system 600 may be provided with a variety of distinct shapes that allow a user to readily identify the function and/or content of each menu item 602. The menu items 602 may be auto-sized according to the text and/or graphics to be displayed.

Menu items 602 may further have a variety of visual states. In one embodiment, menu items 602 may have a normal state, a selected ("tapped") state, and a disabled state. In this embodiment, the normal state of a menu item 602 is the visual state of the item 602 when it is displayed in the menu system 600. The tapped state of a menu item 602 is the visual state of the item 602 that occurs when a user selects ("taps") the menu item 602. For example, a menu item 602 may enter the tapped state for a prescribed duration of time when selected to allow the user to recognize that the menu item 602 was selected. After selection, the menu item 602 may then return to the normal state or be placed in the disabled state. The disabled state of a menu item 602 is used to indicate that the menu item 602 is not a valid selection in a particular context. For example, a menu item 602 in a disabled state may be hidden so that it is not available for selection.

In embodiments, the menu system 600 may include different menu item types. For example, the menu system 600 may include action menu items, toggle menu items, submenu selection menu items, and so forth. Action menu items are used to indicate a particular action that a user can take. In embodiments, action menu items may be identified by a verb (e.g., "Display" or "Dismiss") to indicate the action performed in response to selection of the menu item 602. In some instances, a submenu 606 containing the action menu item may be dismissed upon selection of the menu item 602 so that the action may be performed.

Figure 7:
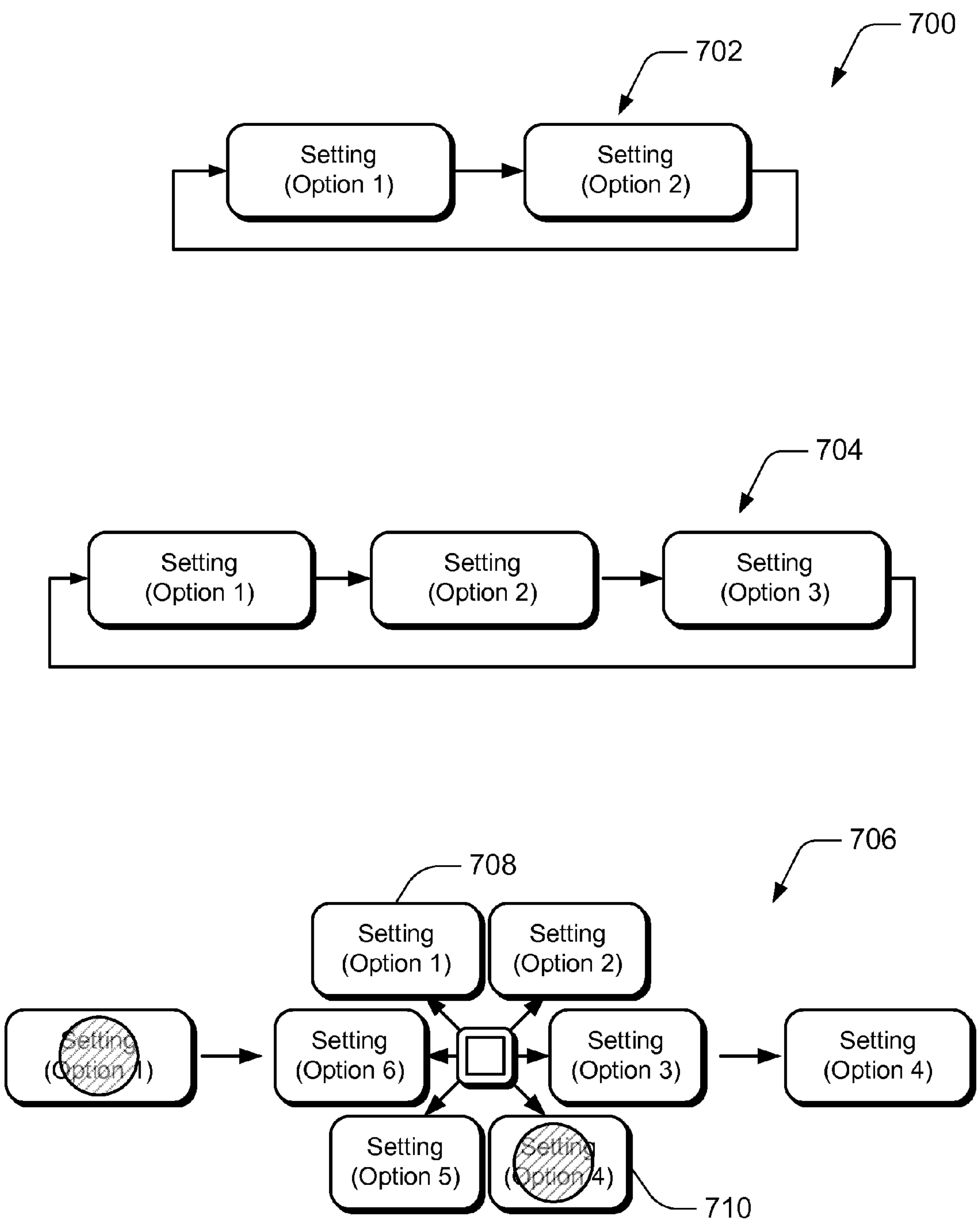
FIG. 7 is an illustration depicting the functionality of various toggle menu items that may be employed by the menu system of FIGS. 6A and 6B.

Toggle menu items toggle between two or more options, for example, to select a setting within an application. FIG. 7 illustrates the functionality of various toggle menu items 700 that may be employed by the menu system 600 shown in FIGS. 6A and 6B. Toggle menu items 700 may include dual toggle menu items 702, tri-toggle menu items 704, and multi-toggle menu items 706. Dual-toggle menu items 702 toggle between two option states. For example, a dual toggle menu item 702 may be utilized to turn a feature (e.g., a wireless transmitter) on or off Tri-toggle menu items 704 toggle between three option states. In this manner, each time the toggle menu item is selected, the value of the setting is changed. For example, a tri-toggle menu item 704 may be used to adjust the size of an element (e.g., text size) between small, medium, and large sizes. In embodiments, the setting adjusted by the dual-toggle and tri-toggle menu items 702 & 704 and the current state of the setting may be identified by indicia (e.g., text, graphics, and so forth) within the menu item 702 & 704.

Multi-toggle menu items 706 toggle between four or more option states. In embodiments, the setting adjusted by a multi-toggle menu item 706 and the current state of the setting may be identified by indicia (e.g., text, graphics, and so forth) within the menu item 706. Selection of a multi-toggle menu item 706 causes a submenu 708 to be displayed. The submenu 708 includes four or more menu items 710 that correspond to the valid options for the setting. Thus, an option may be set by selecting one of the menu items 710 of the submenu 708. After the option is selected, the submenu 708 may be dismissed and the multi-toggle menu item 706 again displayed.

FIGS. 8A, 8B, and 8C illustrate an example system tray 800 that may be employed by the user interface 500 shown in FIG. 5. The system tray 800 displays device status information and holds notifications such as notifications from recently used applications, notifications of recently missed communications, and so forth.

In example implementations, the system tray 800 may be devoid of chrome elements, and may remain hidden from the user until an event occurs that is deemed by an application and/or the user interface 500 to merit the user's attention. For example, the system tray 800 may be hidden during full screen notifications, during an active phone call, while the dashboard 900 (FIG. 9) is active, while the task switcher 1000 (FIG. 10) is active, while taking a photograph, while watching a full screen video, while viewing a full screen photo, while playing a game, and so on. However, when displayed, the system tray 800 may comprise a persistent user experience that is overlaid on top of other user experience content. As shown, the system tray 800 utilizes the bottom left and bottom right corners of the display to display information and host launch points into the dashboard 900 (FIG. 9) and the task switcher 1000 (FIG. 10).

In implementations, the system tray 800 may be comprised of a task switcher launch point 802 and a dashboard launch point 804. The task switcher launch point 802 may be located in the bottom left corner of the display 112. In embodiments, the task switcher launch point 802 allows the task switcher to be selected via a single tap gesture. Further, when multiple tasks are available, the task switcher launch point 802 may be configured to display an icon representing the most recent task accessed by the user (as identified by the task switcher). As the user changes to a new task using the task switcher, this icon may be updated to reflect the changes made within the task switcher.

As shown in FIG. 8B, the task switcher launch point 802 may also host incoming communication related notifications 806 such as phone calls, emails, instant messages (e.g., SMS/MMS/IM), and so forth, which are dismissed (not read), or for which the maximized state the notification has timed out causing the notification to be minimized or hidden. Additionally, during phone calls, the task switcher launch point 802 may provide in-call notifications such as call waiting notifications, missed call notifications, voice mail notifications, email notifications, and so forth. Similarly, the task switcher launch point 802 may display a persistent icon if a phone call user experience is minimized in order to access another application, such as when the phone call is put on hold. In embodiments, this icon may include the time that the call has been active.

As illustrated, the dashboard launch point 804 may be located in the bottom right corner of the display 112. The dashboard launch point 804 allows a dashboard (such as the dashboard 900 of FIG. 9 discussed below) to be launched via a input by the user, such as a single tap gesture. The dashboard launch point 804 may also be configured to host device status notifications 808 that are determined to be important to the user by the user interface. In implementations, the dashboard launch point 804 may include a clock 810 that is displayed when no device status notifications 808 are present. However, when a device status notification 808 is available, the notification 808 may be displayed in place of or in addition to the clock 810. The dashboard launch point 804 may further display an indication indicating signal strength 812 during phone calls.

In example embodiments, communication related notifications 806 and device status notifications 808 may have at least two states: minimized and maximized. In embodiments, a device status notification 808 is displayed in either the maximized or minimized states while the status condition that triggered the notification 808 exists. For example, when a device status notification 808 is first displayed, the notification 808 is furnished in the maximized state so that the notification 808 may be viewed by the user. After a duration of time (e.g., 3 seconds), the device status notification 808 may transition to the minimized state. FIGS. 6B and 6C illustrate a device status notification 808 in a maximized state (FIG. 6B) and a minimized state (FIG. 6C).

Figure 9:
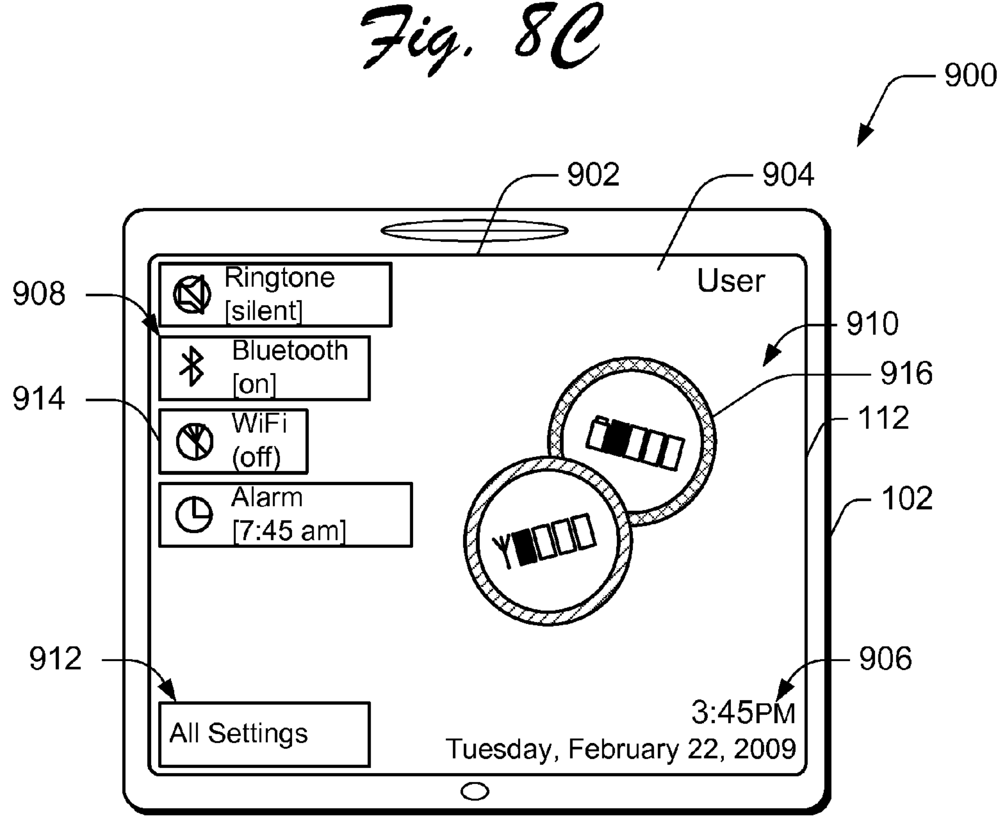
FIG. 9 is an illustration depicting an example dashboard that may be launched from the dashboard launch point of the system tray of FIGS. 8A, 8B, and 8C.
Figure 10:
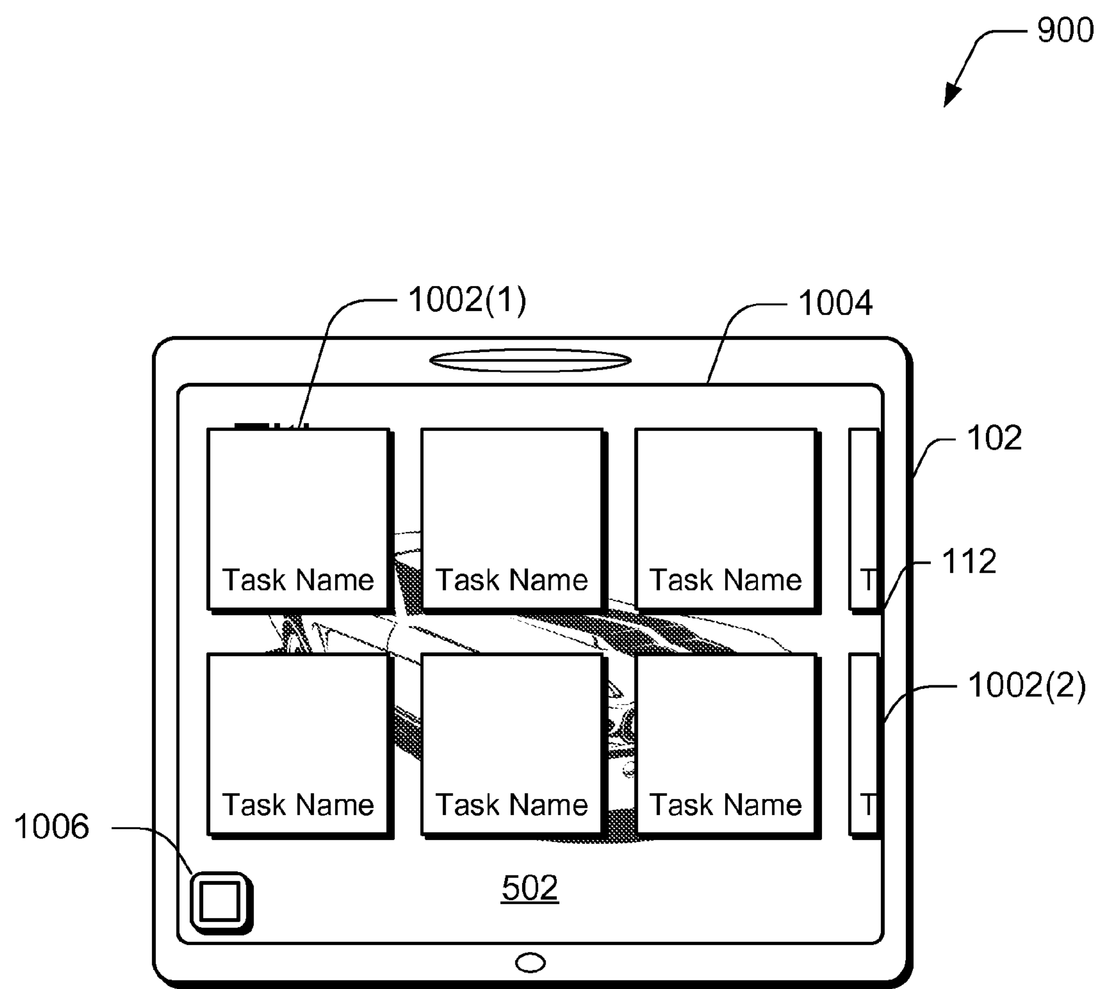
FIG. 10 is an illustration depicting an example chromeless task switcher that may be launched from the task switcher launch point of the system tray of FIGS. 8A, 8B, and 8C.

In implementations, a user may select a device status notification 808 while the notification 808 is in the maximized state to launch a dashboard (e.g., dashboard 900 (FIG. 9). After returning from the dashboard, the device status notification 808 may thereafter be displayed in a minimized state. In the minimized state, the device status notification is not viewable by the user. Instead, indicia (e.g., ring shaped icon 814 shown in FIG. 8C) may be displayed within the dashboard launch point 804 to indicate that a minimized device status notification 808 is present. The user may select the indicia 816 to launch the device status notification 808 in the maximized state. Similar indicia (e.g., ring shaped icon 816 in FIG. 8C) may be used to display communication related notifications 806 in a minimized state.

FIG. 9 illustrates an example dashboard 900 that may be launched from the dashboard launch point 804 of the system tray 800 shown in FIGS. 8A, 8B, and 8C. The dashboard 900 provides functionality to toggle frequently used settings for the mobile device 102, obtain information about a device status, enter a settings area or menu for the device, and so forth. In implementations, the dashboard 900 may comprise an overlay 902 that is displayed by the display 112 of the mobile device 102 in place of the user experience of the device when the dashboard 900 is launched.

As shown in FIG. 9, the overlay 902 may be divided into areas that provide a variety of information describing the operation of the mobile device. In the embodiment illustrated, the overlay 902 may include an operator information/roaming status area 904, a current date/time area 906, settings quick toggle area 908, a device status area 910, and an advanced settings launch point area 912. The operator information/roaming status area 904 identifies the operator (e.g., an owner or user) of the mobile device 102 and may provide information describing the roaming status of the device 102. The current date/time area 906 displays a current date and time. The settings quick toggle area 908 contains a bank of tabs 914 describing settings (e.g., "Ringtone," "Bluetooth," "Wi-Fi," and "Alarm") that can be toggled (e.g., on/off) and displays status information about the settings (e.g., "silent," "on," "off," "7:45 am," respectively).

The device status area 910 provides information about the status of the mobile device 106 such as battery life, wireless signal strength, and so forth. In embodiments, the device status area 910 may display status notifications via one or more graphical elements. For example, in the embodiment shown, icons 916 that are generated to give the impression of "stickers" are used to display status information for the mobile device 102. The icons 916 may be formatted to provide information about the status notification. The advanced settings launch point area 912 furnishes access a detailed settings page that allows adjustment of settings not provided by dashboard 900.

FIG. 10 illustrates an example task switcher 1000 that may be launched from the task switcher launch point 802 of the system tray 800 shown in FIGS. 8A, 8B, and 8C. The task switcher 1000 allows the active task running on the mobile device 102 (e.g., the task providing a user experience including content displayed by the display 112) to be changed or switched with another task that is running but not active. The task switcher 1000 may also function as an entry point for displaying dismissed messages (e.g., instant messages, electronic messages, voicemail notifications, and so forth).

In embodiments, the task switcher 1000 may be configured to display indicia such as thumbnails 1002 corresponding to non-active (e.g., minimized or hidden) tasks running on the mobile device 102 in a translucent overlay 1004 superimposed the then current user experience 502 (e.g., the user experience 502 of an active task). A user may interact with the task switcher 1000 in a variety of ways. For example, the user can select a task by selecting a thumbnail 1002 corresponding to the task. The user may pan through thumbnails 1002 provided via the overlay 1004. In instances where more thumbnails 1002 are available than are be displayed, thumbnails may be scrolled onto and off of the overlay 1004. For example, as shown in FIG. 10, the overlay 1004 may be configured to display a limited number of thumbnails 1002(1) at a given time.

Additional thumbnails 1002(2) that are not displayed but which are available for selection by the user may appear to be partially hidden under an edge of the overlay 1004. A user may then pan through the displayed thumbnails 1002(1) to cause one or more of the additional thumbnails 1002(2) to be scrolled onto the display while one or more of the originally displayed thumbnails 1002(1) are scrolled off of the display and hidden. If a new task is not selected, the user may exit the task switcher 1000 and return to the task that was running when the switcher 1000 was launched by selecting a back button 1006. The task switcher 1000 may also time out and be dismissed and hidden automatically after a period of inactivity. For example, the task switcher may be hidden after 5 seconds have elapsed if the user has provided no input such as panning through the thumbnails 1002 or selecting a thumbnail 1002.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

executing an application configured to furnish a user experience for a display by a mobile device; and implementing a user interface configured to cause an application programming interface (API) to be generated to expose functionality to the application to configure the application for chromeless display of the user experience by the mobile device, the user interface comprising a task switcher configured to be:

initially hidden from view in a user experience of an active task; and displayed in an overlay superimposed over the user experience of the active task in response to a user request to launch the task switcher, the task switcher containing one or more selectable indicia corresponding to non-active tasks running on the mobile device.

2. A method as recited in claim 1, wherein a user selection of an indicium of the one or more selectable indicia causes the user interface to switch to a user experience of a non-active task corresponding to the respective indicium.

3. A method as recited in claim 2, wherein the task switcher is no longer displayed responsive to the user selection of the indicium.

4. A method as recited in claim 1, wherein the task switcher is no longer displayed responsive to a user input dismissing the task switcher.

5. A method as recited in claim 1, wherein the user interface further includes a system tray and wherein the request to launch the task switcher comprises a user selection of a launch point in the system tray.

6. A method as recited in claim 5, wherein the system tray is configured to be initially hidden from view in the user experience of the active task and displayed in an overlay superimposed over the user experience of the active task in response to a notification affecting operability of the device.

7. A method as recited in claim 1, wherein the active and non-active tasks correspond to applications or notifications.

8. A method as recited in claim 1, wherein the task switcher hosts incoming communication related notifications.

9. A method as recited in claim 1, wherein the one or more selectable indicia comprises an indicium corresponding to the most recent task accessed by the user.

10. A method as recited in claim 1, wherein the overlay comprises a translucent display of the task switcher over the user experience of the active task.

11. A method comprising:

executing an application configured to furnish a user experience for a display by a mobile device; and implementing a user interface configured to cause an application programming interface (API) to be generated to expose functionality to the application to configure the application for chromeless display of the user experience by the mobile device, the user interface comprising a dashboard configured to be:

executable to access one or more common settings of the mobile device;

initially hidden from view in the user experience; and displayed in an overlay superimposed over the user experience in response to a user request to launch the dashboard.

12. A method as described in claim 11, wherein the user request to launch the dashboard comprises selecting a launch point from a system tray.

13. A method as described in claim 12, wherein the system tray is configured to be initially hidden from view in the user experience and displayed in an overlay superimposed over the user experience in response to a notification affecting operability of the device.

14. A method as described in claim 11, wherein the user request to launch the dashboard comprises selecting a device status notification.

15. A mobile device comprising:

a display;

at least one processor; and one or more computer-readable memory or storage devices storing instructions that, when executed by the at least one processor, cause a user interface to be configured for display by the display, the user interface comprising a system tray configured to be initially hidden from view and displayed in the user interface in response to a notification containing device status information affecting operability of the mobile device.

16. A mobile device as described in claim 15, wherein the user interface further comprises a task switcher and a dashboard.

17. A mobile device as described in claim 16, wherein the system tray includes launch points for a task switcher and a dashboard, the launch points executing the switcher or dashboard in response to a user selection of the respective launch point.

18. A mobile device as described in claim 16, wherein the dashboard is executed responsive to a user selection of the notification containing device status information affecting operability of the device.

19. A mobile device as described in claim 16, wherein the task switcher contains one or more selectable indicia corresponding to non-active tasks running on the mobile device.

20. A mobile device as described in claim 19, wherein the selecting an indicium from the one or more selectable indicia switches the user interface from an active task to the non-active task corresponding to the indicium.

* * * * *